US012272219B1

(12) United States Patent
Bower

(10) Patent No.: US 12,272,219 B1
(45) **Date of Patent: *Apr. 8, 2025**

(54) PRESENCE DETECTION AND NOTIFICATION SYSTEM

(71) Applicant: Daniel F. Bower, Conifer, CO (US)

(72) Inventor: Daniel F. Bower, Conifer, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,872

(22) Filed: Jan. 9, 2023

Related U.S. Application Data

(63) Continuation of application No. 17/106,041, filed on Nov. 27, 2020, now Pat. No. 11,551,533.

(60) Provisional application No. 62/941,097, filed on Nov. 27, 2019.

(51) Int. Cl.

| | |
|---|---|
| ***G08B 21/02*** | (2006.01) |
| ***G08B 5/38*** | (2006.01) |
| ***G08B 7/06*** | (2006.01) |
| ***G08B 13/19*** | (2006.01) |

(52) U.S. Cl.
CPC ............... *G08B 13/19* (2013.01); *G08B 5/38* (2013.01); *G08B 7/06* (2013.01)

(58) Field of Classification Search
CPC ............. G08B 13/19; G08B 5/38; G08B 7/06
See application file for complete search history.

(56) References Cited

U.S. PATENT DOCUMENTS

| | | | | |
|---|---|---|---|---|
| 2007/0229308 | A1* | 10/2007 | Stalp ...................... | G08G 1/005 340/944 |
| 2017/0243458 | A1* | 8/2017 | Langford ............... | G08B 21/02 |
| 2020/0043353 | A1* | 2/2020 | Steadman .............. | G08B 13/16 |

FOREIGN PATENT DOCUMENTS

| | | | |
|---|---|---|---|
| AU | 9897193 | A | 7/1999 |
| KR | 20130043781 | A | 5/2013 |

* cited by examiner

*Primary Examiner* — Hongmin Fan
(74) *Attorney, Agent, or Firm* — Malcolm Pipes

(57) ABSTRACT

A system and a method for presence detection and notification. The system includes a a first unit including a first sensor and a first visual alert, and a second unit including a second sensor and a second visual alert. The first unit is constructed to send a signal to the second unit to trigger the second visual alert, when the first sensor detects a presence. The second unit is constructed to send a signal to the first unit to trigger the first visual alert, when the second sensor detects a presence. The first and second visual alerts are constructed to be triggered independently of one another.

21 Claims, 26 Drawing Sheets

PRESENCE DETECTION AND NOTIFICATION SYSTEM

CROSS-REFERENCE TO RELATED APPLICATION

This application is a continuation of application Ser. No. 17/106,041, filed Nov. 27, 2020, now U.S. Pat. No. 11,551,533, which claims the benefit of Provisional Application No. 62/941,097, filed Nov. 27, 2019, which is hereby incorporated by reference.

TECHNICAL FIELD

The present disclosure generally relates to a presence detection and notification system.

BACKGROUND

Notification systems can provide notifications to users regarding a presence of an object such as a human or other animal. These systems may provide a visual alert to the user.

SUMMARY

Embodiments of the present disclosure can provide an inexpensive way to improve safety and security. For instance, a system may expand the usefulness of motion-activated lights, similar to those already in use in millions of homes. The system may combine two motion sensor devices to virtually "see through" a solid door.

Every day collisions occur at solid doors that have high-traffic volume. This includes restroom and kitchen doors in restaurants, as well as restroom and stair doors in office buildings and industrial facilities. In some embodiments, a device gives an instant alert that someone is on the other side of a solid door. A paired device design may provide a warning on both sides of the door. Any movement on either side of the door may alert the opposite side with a visual alert (e.g., an alert light).

Additionally, in some embodiments, a simple switch can put the system into a security mode, in which a visual alert is activated only on the interior side of the door when motion is detected on the exterior side. In this security mode, the light on the exterior side is deactivated.

The system may be affordable to most homes and businesses, and the value it adds may quickly become indispensable. Installation may be quick and easy. The devices may also be easy to remove and install in a different location.

The present disclosure includes one or more of a system, method, means, and device configured to provide a notification based on a sensed event. In one embodiment, the device is associated with a door.

The disclosure includes systems for presence detection and notification. In an exemplary embodiment, a system includes a first unit including a first sensor and a first visual alert, and a second unit including a second sensor and a second visual alert. The first unit is constructed to send a signal to the second unit to trigger the second visual alert, when the first sensor detects a presence. The second unit is constructed to send a signal to the first unit to trigger the first visual alert, when the second sensor detects a presence. The first and second visual alerts are constructed to be triggered independently of one another.

In the above embodiment, the first unit may include a switch for a security mode in which the second visual alert is deactivated. The first and second units may be attachable to or proximate opposite sides of a door. The first and second visual alerts may include an LED. The first unit may include a first audio alert that is triggered by the signal sent to the first unit, and the second unit may include a second audio alert that is triggered by the signal sent to the second unit. The first unit may include a switch that deactivates the first and second audio alerts. The first and second units each may include a wireless transmitter and receiver for communicating with one another. The system may be adapted to be integrated with a computer application to extend alerts to connected devices via a radio transmission. The system may further include a wire ribbon connecting the first detector unit with the second detector unit. The first and second sensors may be passive infrared sensors. The first and second sensors may be proximity sensors. The first visual alert may blink when the first unit no longer senses signal from the second unit. At least one of the first and second units may be integrated into signage. The system may further include two half-barrels adapted to be inserted into a peephole of a door. The half-barrels may have electrical connections integrated therein such that the first and second units can be mounted on opposite sides of the door and electrically connected through the peephole. The first and second units may each include a peephole lens.

In another exemplary embodiment, a system includes a first unit attachable to a surface and a second unit attachable to a surface. The first unit includes a first sensor, a first visual alert, a first audio alert, and a first wireless transmitter and receiver. The second unit includes a second sensor, a second visual alert, a second audio alert, and a second wireless transmitter and receiver. The first wireless transmitter is constructed to send a signal to the second wireless receiver to trigger the second visual alert and the second audio alert, when the first detector detects a presence. The second wireless transmitter is constructed to send a signal to the first wireless receiver to trigger the first visual alert and the first audio alert, when the second sensor detects a presence. The system is configured such that the first and second visual alerts can be triggered independently of one another, and the first and second audio alerts can be triggered independently of one another. The first unit includes a switch for a security mode in which the second alert is deactivated. The first unit includes an audio switch for deactivating the first and second audio alerts. The first and second wireless transmitters may be radio frequency transmitters, and the first and second wireless receivers may be radio frequency receivers. The first wireless transmitter and receiver and the second wireless transmitter and receiver may be Bluetooth capable.

The present disclosure further provides for methods for presence detection and notification. In an exemplary embodiment, a method includes providing a first unit including a first sensor and a first visual alert, and a second unit including a second sensor and a second visual alert. The method further includes installing or setting at least one of the first and second units on a surface. The method further includes sending a signal from the first unit to the second unit when a presence is detected by the first visual alert, to trigger the second visual alert. The method further includes sending a signal from the second unit to the first unit when a presence is detected by the second sensor, to trigger the first visual alert. The method further includes putting the system into a security mode by using a switch on the first unit, wherein, in the security mode, the second visual alert is deactivated. The method may further include installing the first and second units on or proximate to opposite sides of a door. The method may further include installing the first and second units at or proximate to a corner between two walls or partitions.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the present disclosure.

BRIEF DESCRIPTION OF THE DRAWINGS

Various ones of the appended drawings merely illustrate example embodiments of the present disclosure and should not be considered as limiting its scope.

DETAILED DESCRIPTION

Embodiments of the present disclosure relate to a presence detection and notification system in which two units communicate with each other. For instance, when a first unit detects a presence, it sends a signal to a second unit causing the second unit to provide a visual alert. Similarly, when the second unit detects a presence, it sends a signal to the first unit causing the first unit to provide a visual alert.

In one aspect, the alerts provided by the first and second units are triggered independently of one another. For instance, the first unit's visual alert can be triggered by a presence detected by the second unit, and not by a presence detected by the first unit. Additionally, for example, the second unit's visual alert can be triggered by a presence detected by the first unit, and not by a presence detected by the second unit.

Figure 1A:
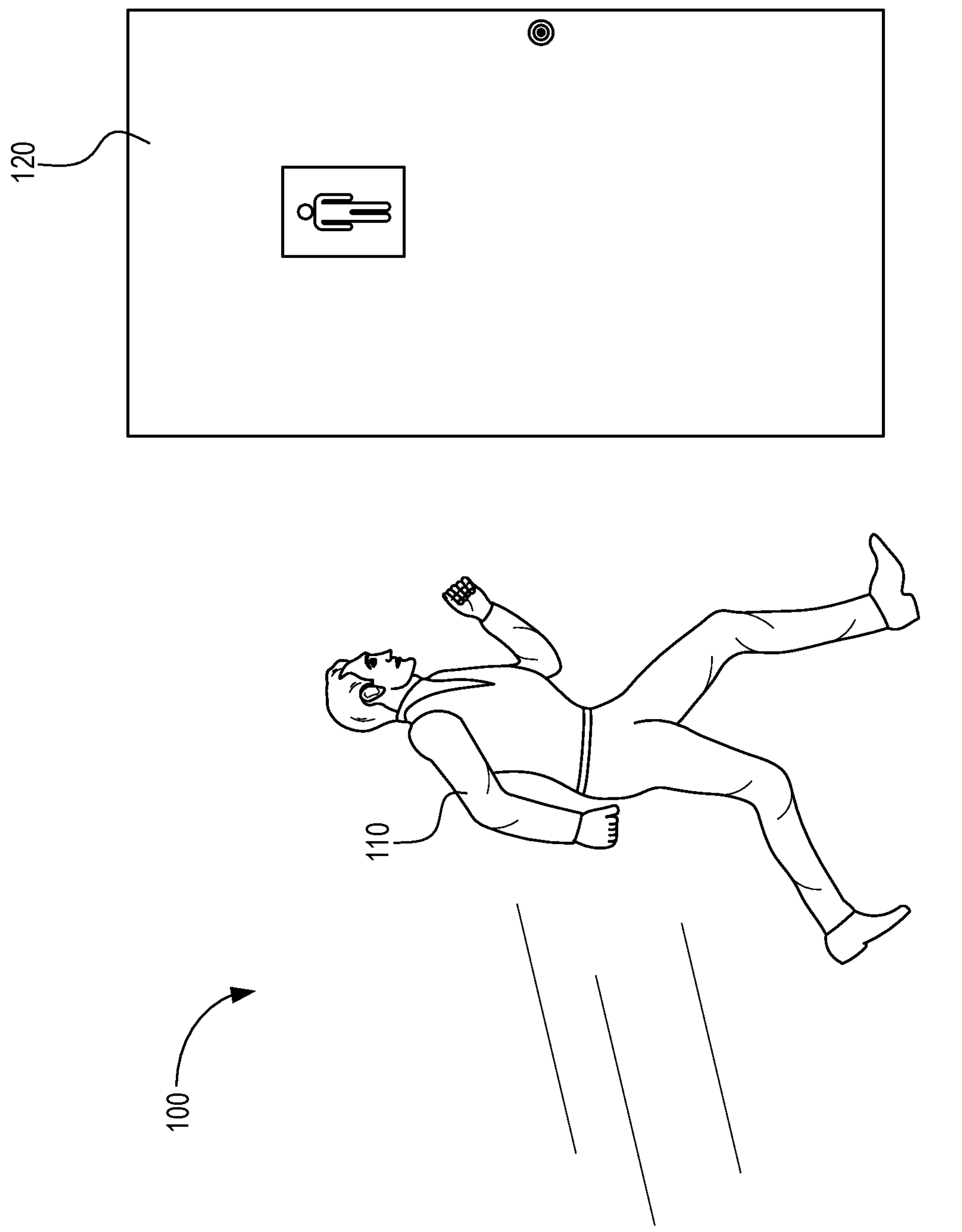
FIGS. 1A and 1B illustrate a situation in which a person approaches a door and collides with another person.
Figure 1B:
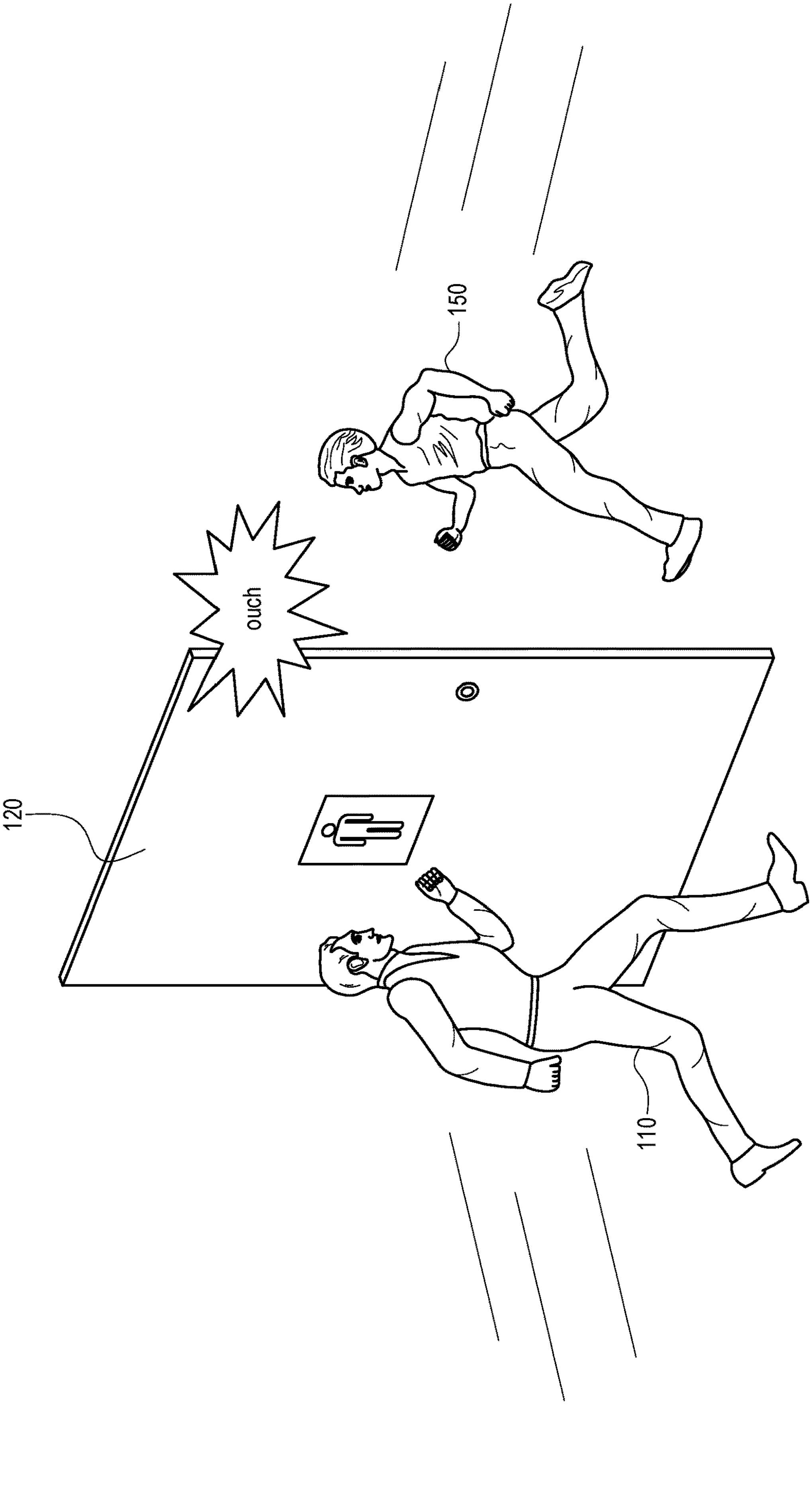

Turning to the figures, FIG. 1A shows a situation 100 in which a person 110 is approaching a restroom door 120. As shown in FIG. 1B, the person 110 is not aware that another person 150 is on the other side and a collision occurs. This may cause injury and frequently causes embarrassment.

Figure 2:
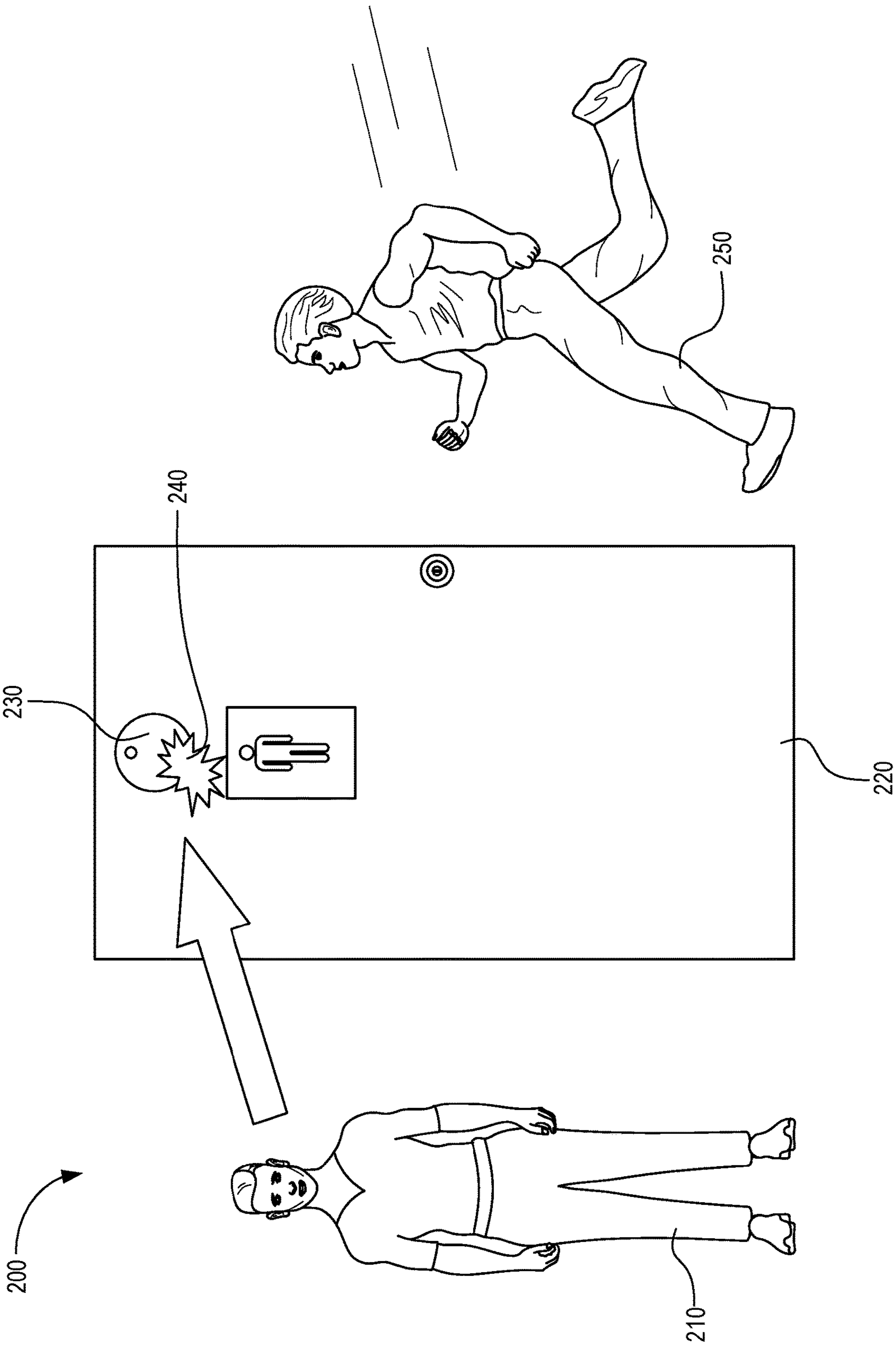
FIGS. 2 and 3 illustrate presence detection and notification systems including visual alerts, according to some example embodiments.

FIG. 2 shows a situation 200 in which a person 210 approaches a restroom door 220. The device 230 gives an instant visual alert 240 when motion is detected from person 250 on the other side. Devices on both sides of the door alert of motion on the other side and to use caution when opening. An activated light does necessarily mean "stop"; it may mean "proceed with caution". If movement is not sensed on the other side, the light (and beep) does not activate.

Solid exterior doors (e.g., apartment doors) may give no visual indication that someone is on the other side. A door viewer (e.g., a peephole) is only useful if one takes the time to stop and look through it.

Figure 3:
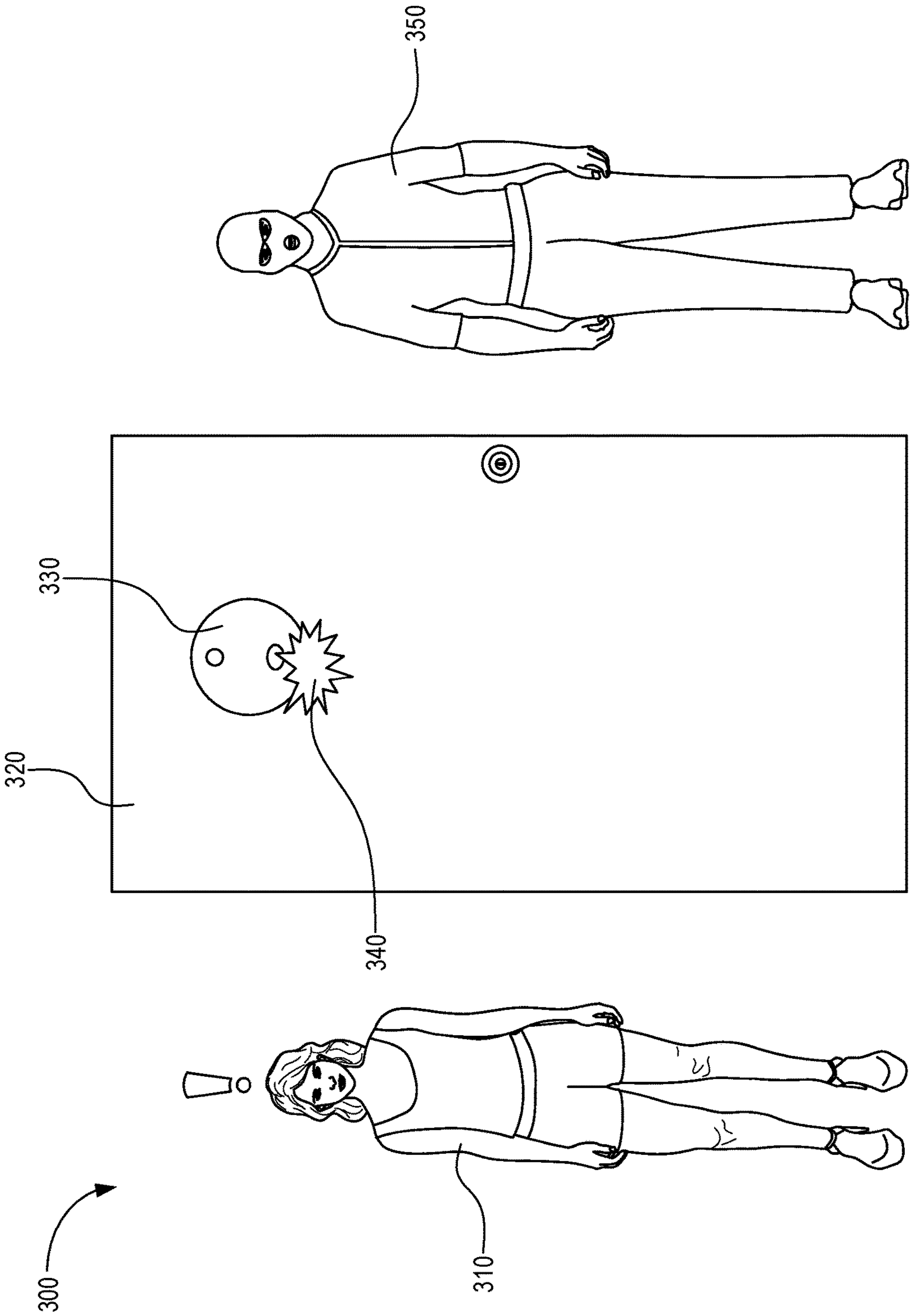

FIG. 3 shows a situation 300 in which a person 310 is on one side of an apartment door 320. A potentially dangerous individual 350 is on the other side of the door. The device 330 gives an instant visual alert 340 (e.g., light) if motion is detected. When set to "Security Mode", the potentially dangerous individual 350 will get no indication of movement on the other side. With the switch moved to the Security setting, the alert light on the exterior side (not shown) is deactivated. If the alert light 340 is on, the person 310 should check the door viewer and proceed with caution.

In some embodiments, a presence detection and notification system may be used to increase security in various applications. For example, the devices can be used on commercial aircraft flight deck doors, such that pilots can verify there is no presence on the cabin side before opening during flight. As another example, business operators can be alerted of customers entering any space across a long distance as a result of the device's long wireless radio range. In another example, realtors can maintain awareness of visitors to an open house. In another example, there are medical applications where patient movement alerts would be helpful. In another example, a service entrance at the rear of a business (e.g., restaurants) can use the system to ensure employees do not open the service entrance if a presence is detected. In another example, school service officers and administrators can use the devices on hallways, rows of lockers, or library shelf rows to quickly determine if that area is occupied. This may have great potential to expedite school lockdowns/clearings by a great deal.

Figure 4:
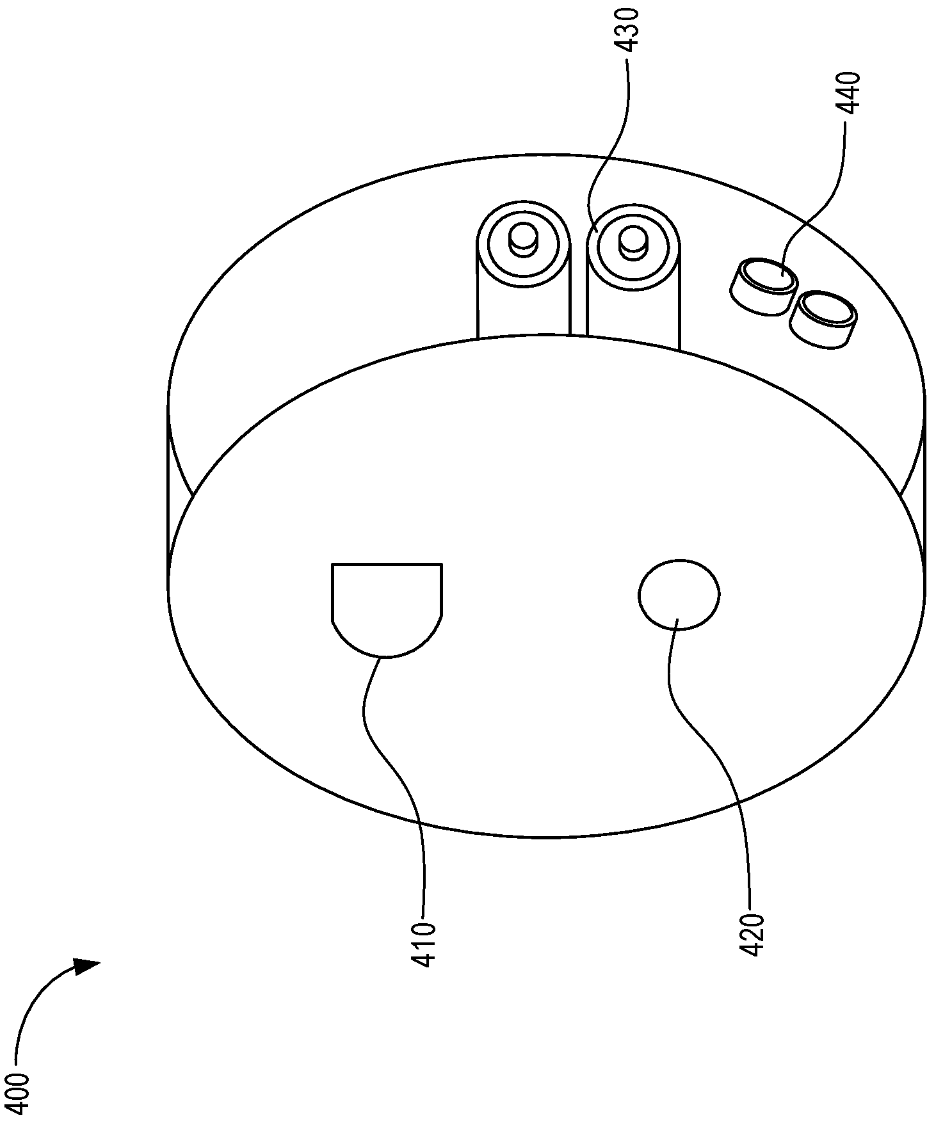
FIG. 4 illustrates a device according to one example embodiment.

In one aspect, a system may include two units (or devices) communicating with one another. Both devices may be approximately 4 inches in diameter and 1.25 inches thick. The device may be lightweight and easy to mount on any door with included adhesive tape. As shown in FIG. 4, the device 400 is powered by two AA batteries 430. Alternatively, the device can be powered by a rechargeable battery. Both devices include a passive infrared (PIR) sensor 410, which senses motion from objects in its field of view, and an alert light 420 (e.g., an LED light). The device further includes switches 440 for Security Mode and Audio Alert on the interior unit only. The switches 440 may be toggled by a user's finger.

Figure 5:
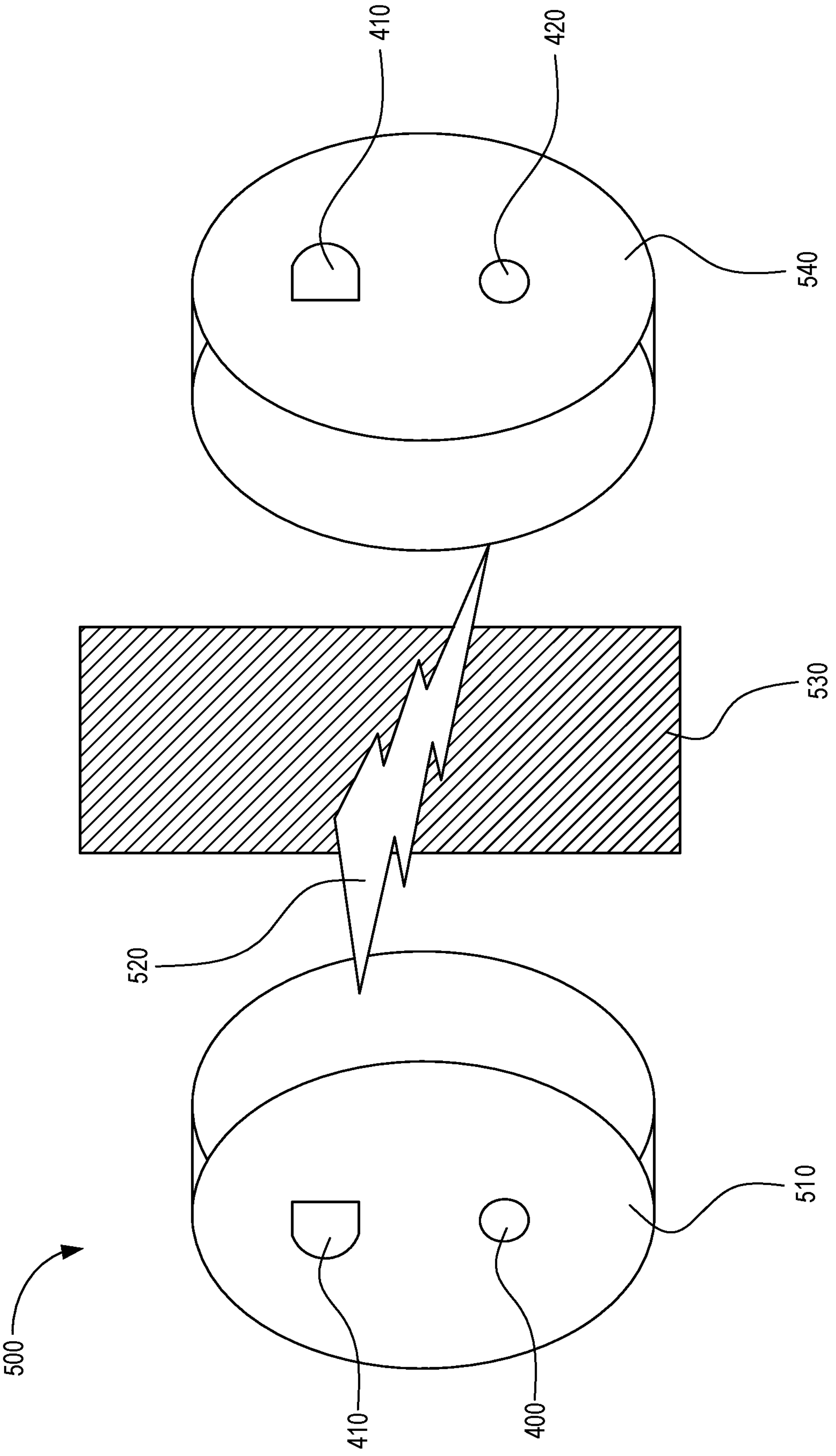
FIG. 5 illustrates a wireless presence detection and notification system according to an example embodiment.

FIG. 5 shows a system 500 in which two devices 510 and 540 are paired wirelessly. This wireless design uses radio frequency communication 520 between devices. The radio frequency 520 is able to pass through the door 530.

Figure 6:
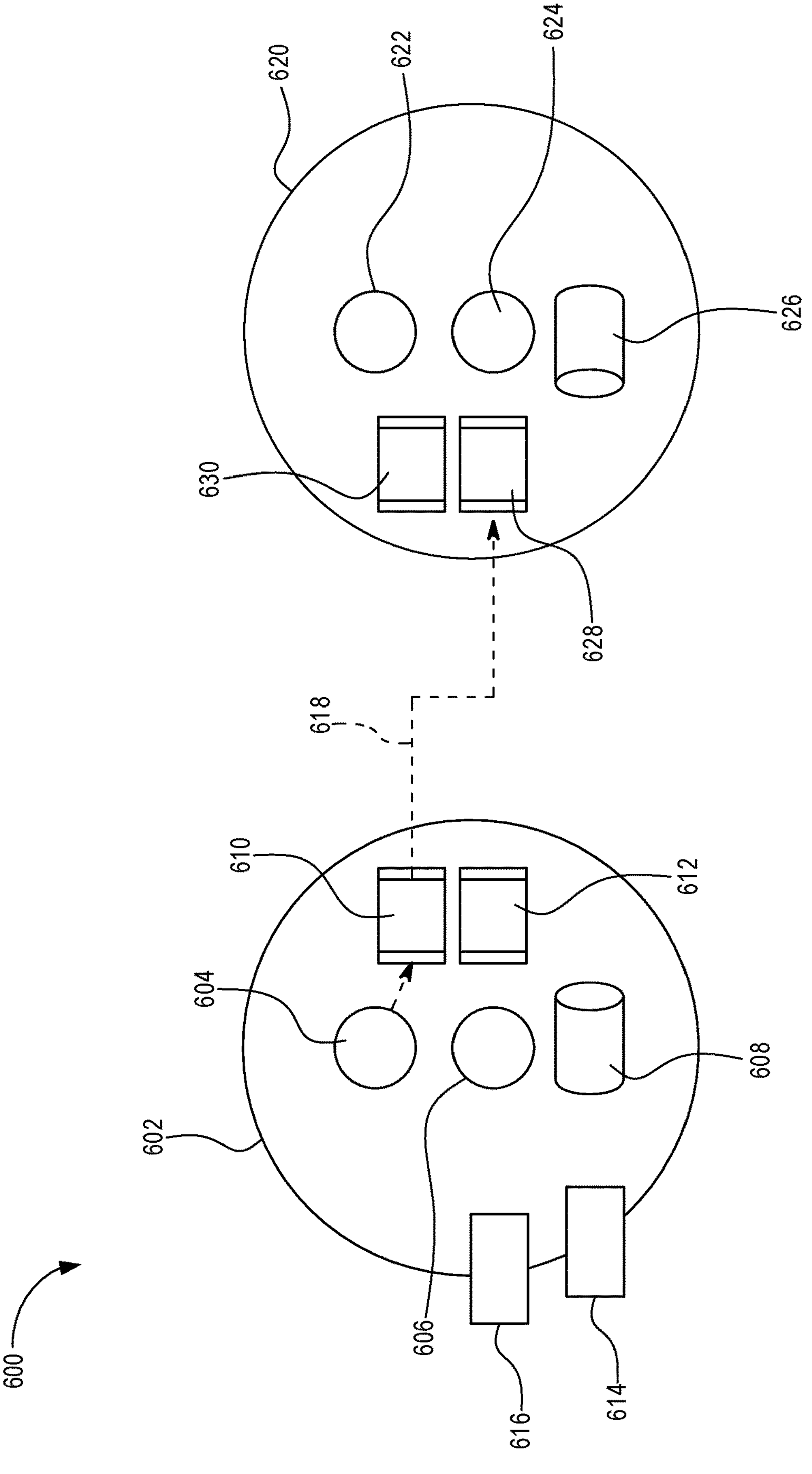
FIG. 6 is a schematic representation of a wireless presence detection and notification system according to an example embodiment.

FIG. 6 shows a schematic of a wireless system 600 including an interior unit 602 and an exterior unit 620. The interior unit 602 includes PIR sensor 604, LED 606, battery 608, radio frequency transmitter 610, and radio frequency receiver 612. The interior unit 602 further includes an audio switch 614 and a security switch 616. The exterior unit 620 includes PIR sensor 622, LED 624, battery 626, radio frequency receiver 628, and radio frequency transmitter 630. When motion is detected by the PIR sensor 604, a signal may be sent to the transmitter 610 which transmits a wireless signal 618 to the receiver 628. The receiver 628 then sends a signal to the LED 624 causing it to light. As such, motion detected by the interior unit 602 may trigger a light signal on the exterior unit 620.

While FIG. 6 shows radio frequency transmitter 610 and radio frequency receiver 612 as separate components, it should be appreciated that the transmitter and receiver can be integrated into a single chip. Similarly, radio frequency receiver 628 and radio frequency transmitter 630 can be integrated into a single chip.

When the security switch 616 on the interior unit 602 is in the "off" position, the system 600 is in Normal Mode. In this mode, motion sensed by the exterior unit sensor 622 triggers a signal to the transmitter 630, which in turn transmits a signal to the receiver 612 of the interior unit. This triggers power to the LED light 606 on the interior unit 602 for a predetermined amount of time (e.g., 5 seconds). Similarly, in Normal Mode, motion sensed by the interior unit sensor 604 triggers a signal to the transmitter 610, which in turn transmits a signal 618 to the receiver 628 of the exterior unit. This triggers 5 seconds of power to the LED light 624 of the exterior unit. Power is no longer provided to the respective LED light and the LED turns off, after 5 seconds from the last detected motion.

When the security switch 616 on the interior unit is in the "on" position, the system 600 is in Security Mode. In this mode, motion sensed by the exterior unit sensor 622 triggers a signal to the transmitter 630, which in turn transmits a signal to the receiver 612 of the interior unit. This triggers 5 seconds of power to the LED light 606 on the interior unit 602. On the other hand, when motion is sensed by the interior unit PIR sensor 604 in Security Mode, signal triggering is cut off at the circuit board. Thus, no signal is sent to the radio frequency transmitter 610 of the interior unit 602, and there is no power to the LED light 624 on the exterior unit 620. Accordingly, the security switch 616 on the interior device may make notification one-way only. For instance, a user may receive a visual alert (e.g., light) when someone is outside of their door. But those outside of the door will get no alert as to the user's presence.

The system 600 may also include a Fail-Safe Mode. When one of the units 602 and 620 no longer senses signal from the other unit (e.g., removed from door, battery too low, or incorrect installation), the LED lights on both units (606, 624) will blink at a predetermined rate. For example, the LED light may blink for one second, every 10 seconds (or for a fraction of a second, every 5 seconds). Alternatively, only the LED light 606 on the interior unit may blink in Fail-Safe Mode, when the interior unit no longer senses signal from the exterior unit 620.

When the audio switch (or selector) 614 is in the "on" position, in addition to the power to the LED light, the circuit board emits a short but audible "beep" on the circuit board. This may be the same powering logic as discussed above with light.

Figure 7:
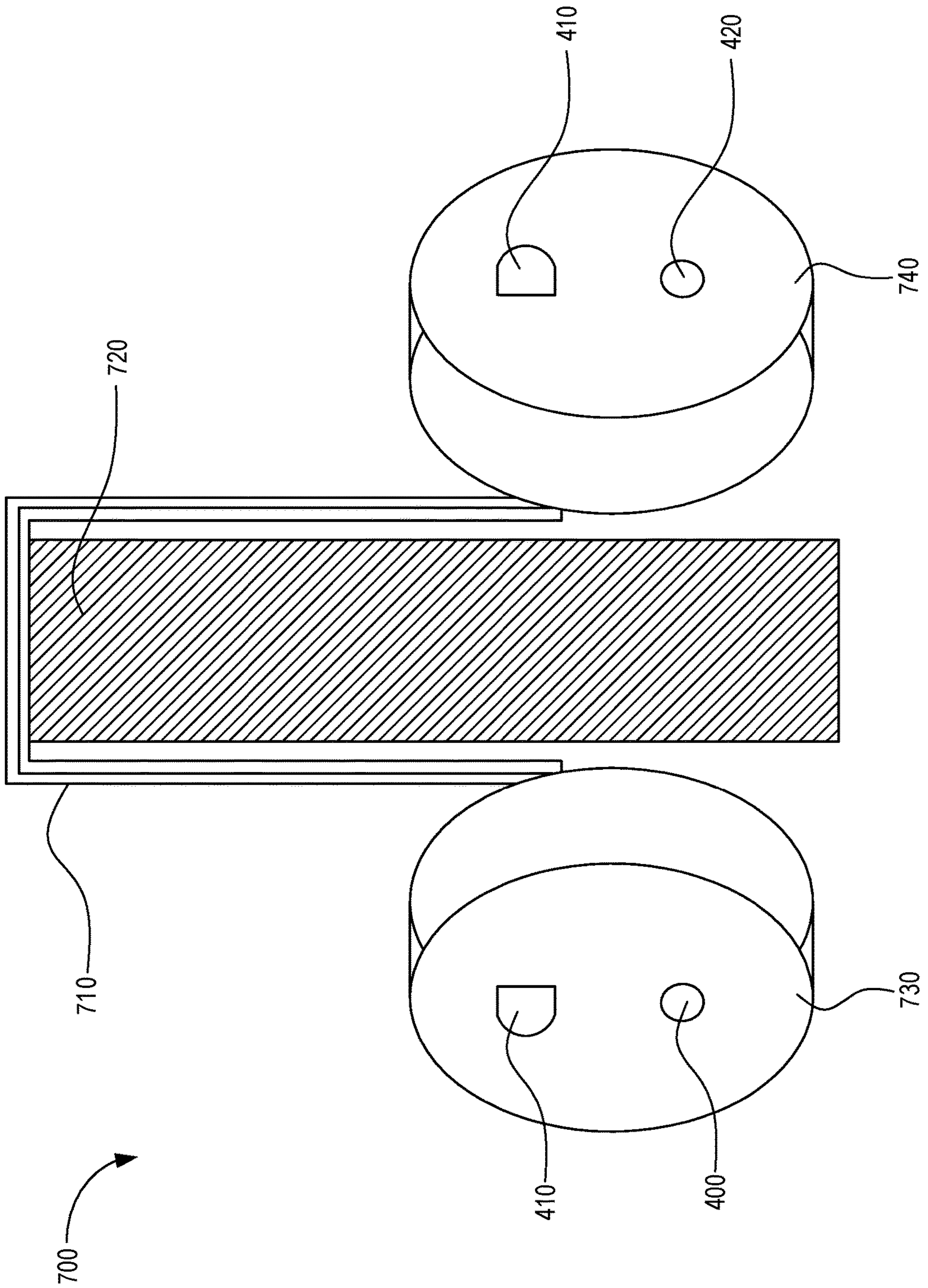
FIG. 7 illustrates a presence detection and notification system in which two devices are attached via a wire ribbon, according to an example embodiment.

FIG. 7 shows a system 700 in which devices 730 and 740 are connected by a strong narrow wire ribbon 710. The wire ribbon 710 is thin enough to fit in the space between the door 720 and the frame. The devices 730 and 740 each have a PIR sensor 410 and an LED light 420. The devices 730 and 740 may have the same configuration as described above with respect to FIG. 4. For instance, each may be powered by AA batteries, and the interior unit may have audio and security switches.

Figure 8:
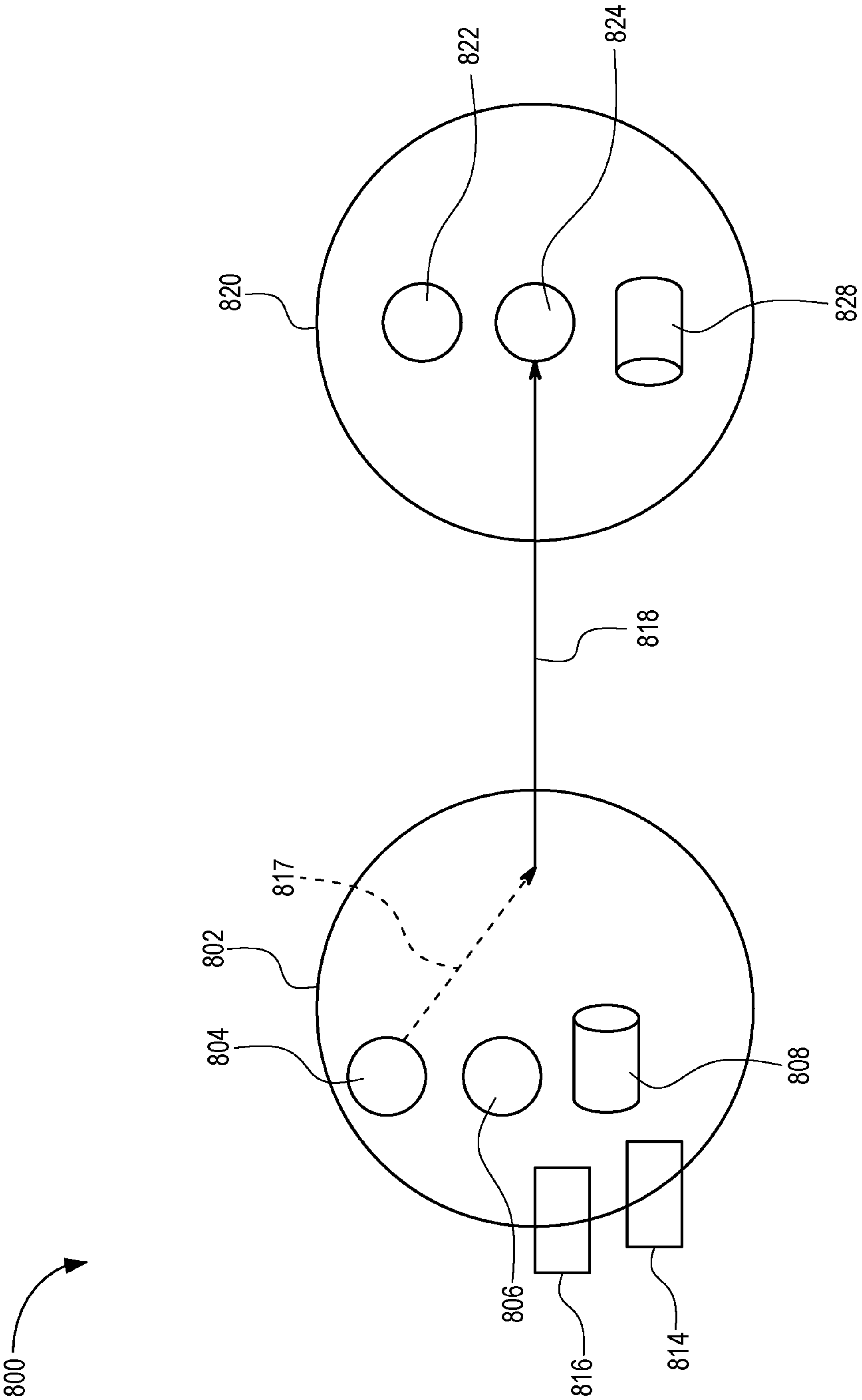
FIG. 8 is a schematic representation of a presence detection and notification system in which two devices are attached via wire, according to an example embodiment.

FIG. 8 shows a schematic of a wired system 800 including an interior unit 802 and an exterior unit 820. The interior unit 802 includes PIR sensor 804, LED 806, battery 808, audio switch 814, and security switch 816. The exterior unit 820 includes PIR sensor 822, LED 824, and battery 826. The interior and exterior units 802 and 820 are connected via a wire ribbon 818. When motion is detected by the PIR sensor 804, a signal 817 may be sent to the wire ribbon 818 which carries a signal to the LED 824 causing it to light. As such, motion detected by the interior unit 802 may trigger a light signal on the exterior unit 820.

When the security switch 816 on the interior unit 802 is in the "off" position, the system 800 is in Normal Mode. In this mode, motion sensed by the exterior unit PIR sensor 822 triggers a signal by wire to the LED light 806 on the interior unit 802. This triggers five seconds of power to the LED light 806. Similarly, in Normal Mode, motion sensed by the interior unit PIR sensor 804 triggers a signal by wire to the LED 824 of the exterior unit 810. This triggers 5 seconds of power to the LED light 824.

When the security switch 816 on the interior unit is in the "on" position, the system 800 is in Security Mode. In this mode, motion sensed by the exterior unit PIR sensor 822 triggers a signal by wire to LED 806 on the interior unit 802. This triggers 5 seconds of power to the LED light 806 on the interior unit 802. On the other hand, when motion is sensed by the interior unit PIR sensor 804 in Security Mode, signal triggering is cut off at the circuit board. As such, no signal is sent to the LED light 824 on the exterior unit.

When the audio switch (or selector) 814 is in the "on" position, in addition to the power to the LED light, the circuit board emits a short but audible "beep" on the circuit board. This may be the same powering logic as discussed above with light.

The system 800 may also include a Fail-Safe Mode. When one of the units 802 and 820 no longer senses signal from the other unit (e.g., removed from door, battery too low, incorrect installation, wire is cut), the LED lights (806, 824) on both units will blink. For example, the LED light on each unit may blink for one second, every 10 seconds. Alternatively, only the LED light 806 on the interior unit 802 will blink in Fail-Safe Mode, when the interior unit no longer senses signal from the exterior unit 820.

Figure 9:
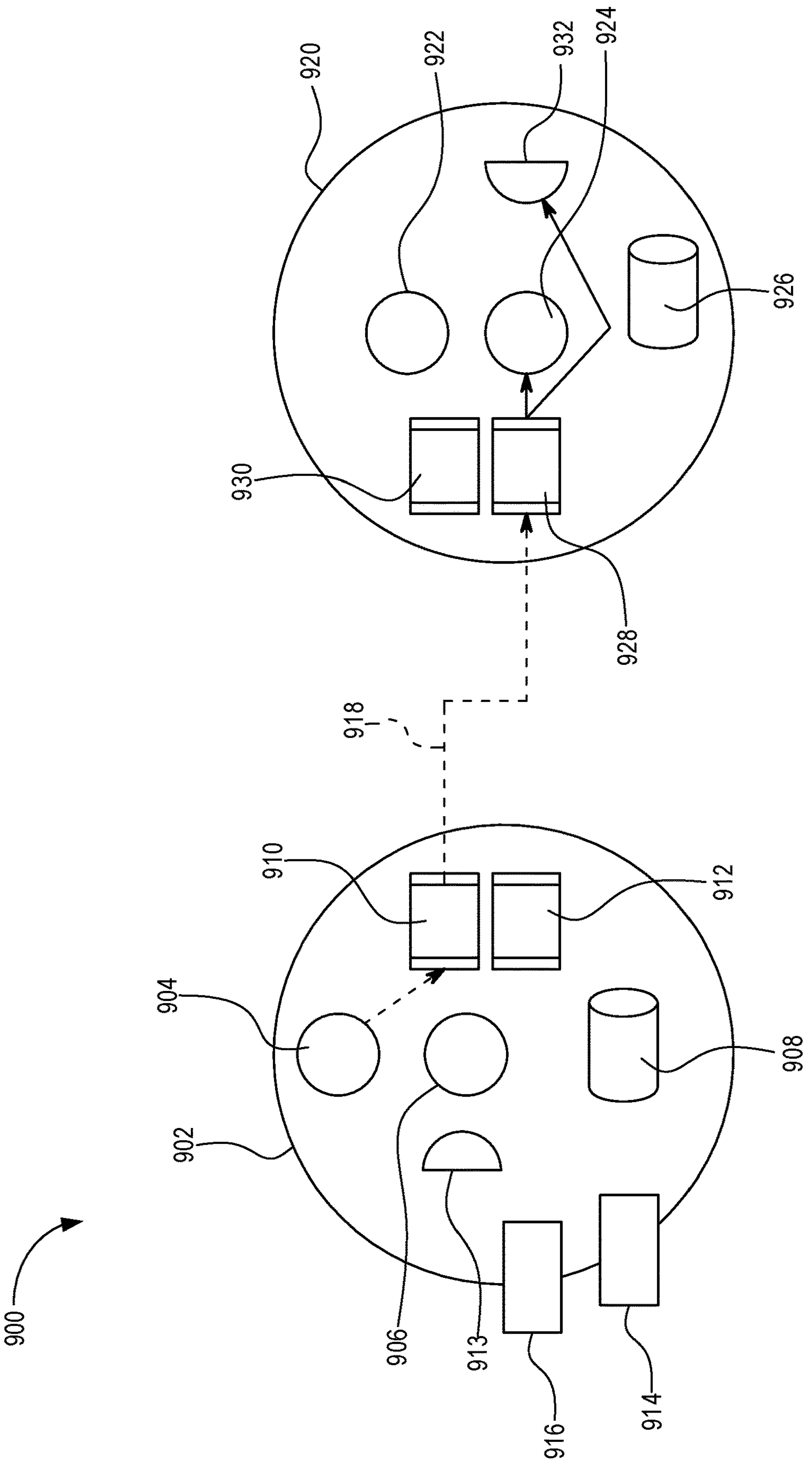
FIG. 9 is a schematic representation of a presence detection and notification system including audio alerts, according to an example embodiment.

FIG. 9 shows a schematic of a wireless system 900 including an audio alert feature. The system 900 includes an interior unit 902 and an exterior unit 920. The interior unit 902 includes PIR sensor 904, LED 906, battery 908, radio frequency transmitter 910, radio frequency receiver 912, and speaker 913. The interior unit 902 further includes an audio switch 914 and a security switch 916. The exterior unit 920 includes PIR sensor 922, LED 924, battery 926, radio frequency receiver 928, radio frequency transmitter 930, and speaker 932. When motion is detected by the PIR sensor 904, a signal may be sent to the transmitter 910 which transmits a wireless signal 918 to the receiver 928. The receiver 928 then sends a signal to the LED 924 causing it to light. In addition, when an audio alert feature is activated, the receiver 928 can send a signal to the speaker 932 causing it to emit a noise. As such, motion detected by the interior unit 902 may trigger the LED light 924 and the speaker 932 on the exterior unit 920.

While FIG. 9 shows radio frequency transmitter 910 and radio frequency receiver 912 as separate components, it will be appreciated that the transmitter and receiver can be integrated into a single chip. Similarly, radio frequency receiver 928 and radio frequency transmitter 930 can be integrated into a single chip.

The system 900 includes a selectable audible "beep" sound emitted by a tiny speaker (913, 932) on a circuit board. Users can activate the audio beep alert by moving the audio switch 914 on the interior unit 902 to "on".

When the security switch 916 on the interior unit 902 is in the "off" position, the system 900 is in Normal Mode. In this mode, motion sensed by the exterior unit sensor 922 triggers a signal to the transmitter 930, which in turn transmits a signal to the receiver 912 of the interior unit. This triggers 5 seconds of power to the LED light 906 on the interior unit 902. In addition, this triggers the speaker 913 (if activated) to emit an audible "beep" noise. Similarly, in Normal Mode, motion sensed by the interior unit sensor 904 triggers a signal to the transmitter 910, which in turn transmits a signal 918 to the receiver 928 of the exterior unit. This triggers 5 seconds of power to the LED light 924 of the exterior unit. In addition, this triggers the speaker 932 (if activated) to emit an audible "beep" noise.

When the security switch 916 on the interior unit is in the "on" position, the system 900 is in Security Mode. In this mode, motion sensed by the exterior unit sensor 922 triggers a signal to the transmitter 930, which in turn transmits a signal to the receiver 912 of the interior unit. This triggers the LED light 906 and the speaker 913 on the interior unit 902. On the other hand, when motion is sensed by the interior unit PIR sensor 904 in Security Mode, signal triggering is cut off at the circuit board. As such, no signal is sent to the radio frequency transmitter 910 of the interior unit 902, and there is no power to the LED light 924 or the speaker 932 on the exterior unit 920.

When the audio switch 914 is set to "off", the speakers (913, 932) on both of the interior and exterior units are deactivated.

The system 900 may also include a Fail-Safe Mode. When one of the units 902 and 920 no longer senses signal from the other unit (e.g., removed from door, battery too low, or incorrect installation), the LED lights on both units (906, 924) may blink. For example, the LED light on each unit may blink for one second, every 10 seconds. Alternatively, only the LED light 906 on the interior unit may blink in Fail-Safe Mode, when the interior unit no longer senses signal from the exterior unit 920.

If the system enters Fail-Safe Mode with the audio switch 914 set to "on", the speakers (913, 932) on both units may emit a noise at regular intervals. Alternatively, only the speaker 913 on the interior unit may emit such a noise in Fail-Safe Mode, when the interior unit 902 no longer senses signal from the exterior unit 920.

The audio alert may be a significant benefit for visually impaired users. For instance, a device with an audio alert could be helpful in office buildings when used at restroom doors, high-traffic hallways, or stairway doors. In addition, it could be helpful in restaurants at high-traffic doors in kitchens, storage rooms, and restrooms. Further, it could be helpful in warehouse environments at locations where pallet movers or automated inventory handling equipment is present. Still further, it could be helpful at medical and dental offices, on exam room doors, high-traffic hallways, storage rooms, and restrooms.

For users who are not visually impaired, the audio alert can be used to hear an alert of motion on the system. One example is using the audio alert to know that mail or a package has been delivered to the front door while in another room. Users can leave the audio alert on full time if they do not want to miss the visual alert.

Figure 10:
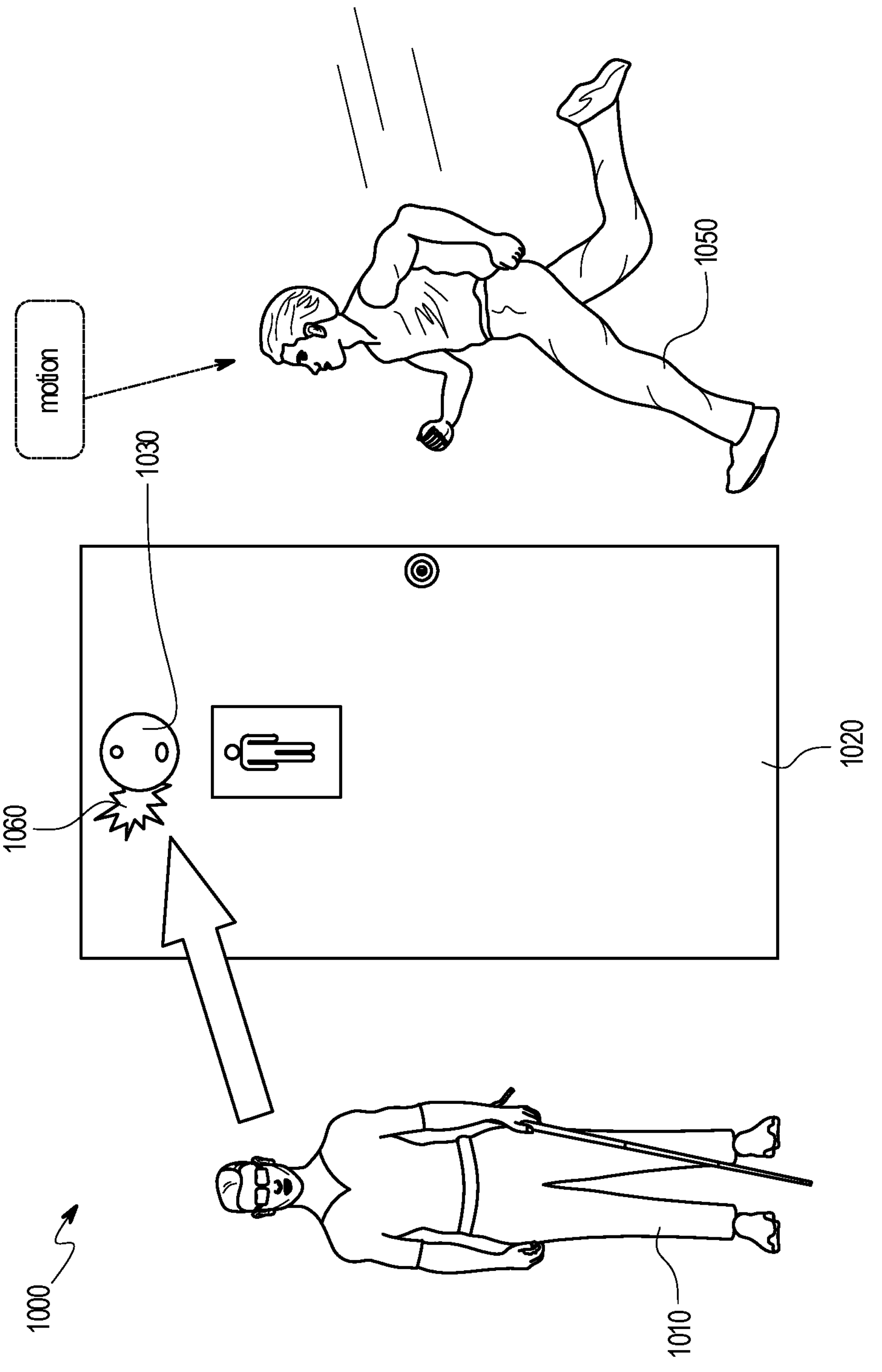
FIG. 10 illustrates a presence and notification system including an audio alert, according to an example embodiment.

FIG. 10 shows a situation 1000 in which a visually impaired person 1010 is approaching a restroom door 1020. When motion is detected from a person 1050 on the other side, the device 1030 gives an instant visual alert and an audio alert simultaneously emits a clearly audible audio beep alert 1060. Thus, the visually impaired person 1010 is notified that someone is on the other side of the door 1020.

Figure 11A:
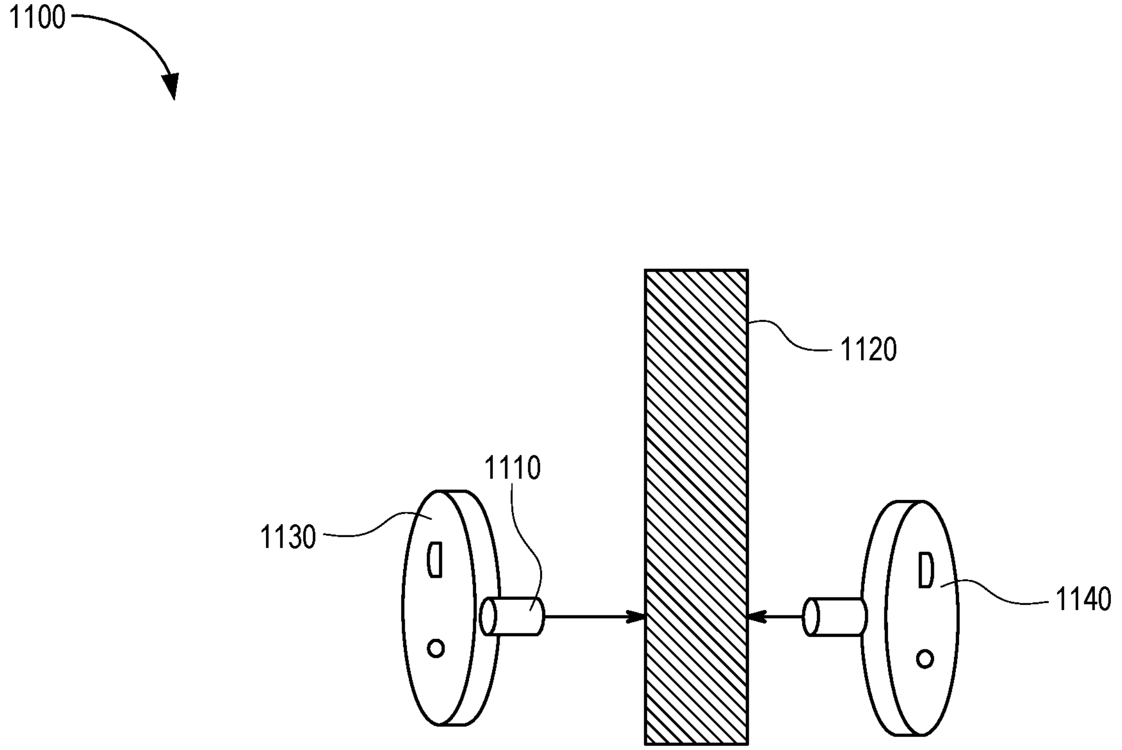
FIGS. 11A and 11B illustrate a presence detection and notification system in which two devices are connected through a door peephole, according to an example embodiment.
Figure 11B:
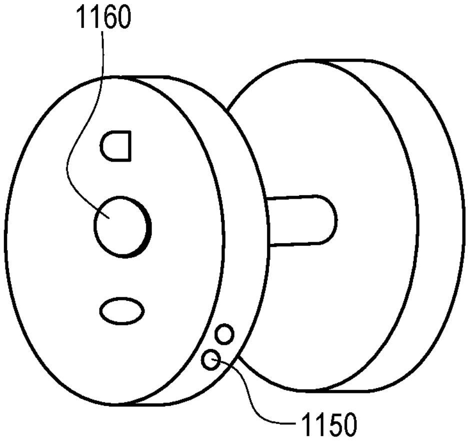

FIGS. 11A and 11B show an embodiment in which a system 1100 may quickly and easily replace an existing peephole. As shown in FIG. 11A, two half-barrels 1110 are inserted into an existing peephole opening in a door 1120. The two half-barrels 1110 slide together through the existing hole. Alternatively, a new hole in the door 1120 can be formed. Electrical connections are integrated into the half-barrels 1110. The electrical connections between the two devices 1130 and 1140 are integrated into the barrel of center pipe pieces and can lock together quickly and easily. The system may include motion detection, audio and/or visual alert, and security mode similar to other embodiments discussed above. For example, as shown in FIG. 11B, switches 1150 for security mode and audio are included on the side of the interior device. The difference is in installation and the addition of a high-quality viewing window (e.g., a peephole) with a 180-degree lens 1160, as shown in FIG. 11B. For instance, the viewing window can act as a peephole/wide angle door viewer. The 180-degree peephole lens 1160 may be integrated with motion detection and audio and visual alerts.

According to some embodiments, a presence detection and notification system may be integrated into signage. These versions may make it quick and simple for facility managers and business owners to add the safety of the system to doors by integrating the system's technology with signs. It is possible to simply replace existing signs with the system's sign. For example, when approaching a restroom door, visitors look at a sign to know which restroom to enter (Women's, Men's, Unisex, Family, etc.). As they are walking toward the door, they may also see a visual light alert and hear an audio beep (if activated) alerting them to motion on the other side of the door. An interior sign may indicate "Exit".

In these embodiments, the wireless or wired connection, circuit board, batteries, etc., may be the same as the residential design. A modification of external housing may provide a way for businesses to include the safety and convenience of the system into a single sign unit.

Figure 12:
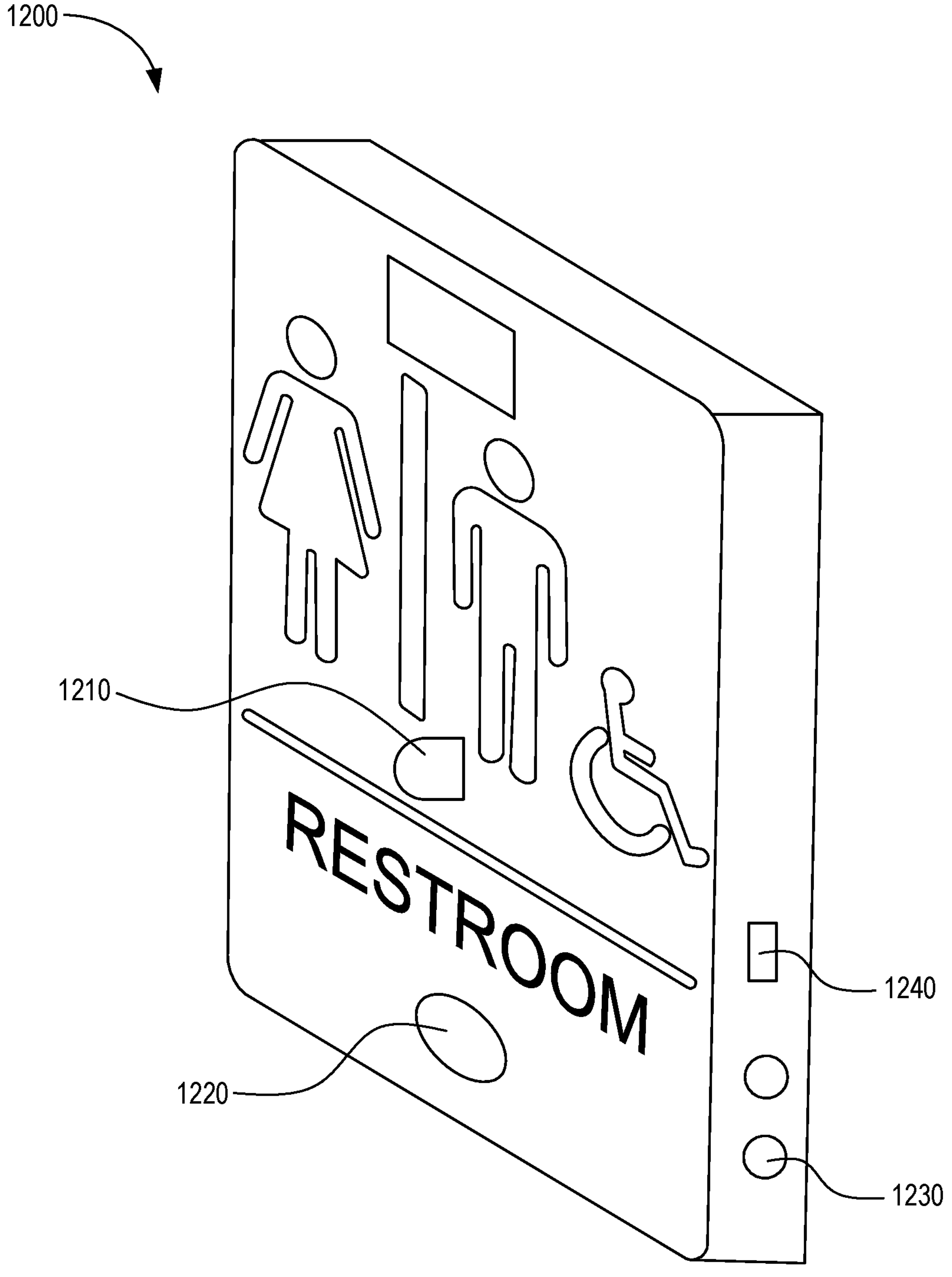
FIG. 12 illustrates a device integrated into a restroom sign, according to one example embodiment.
Figure 13:
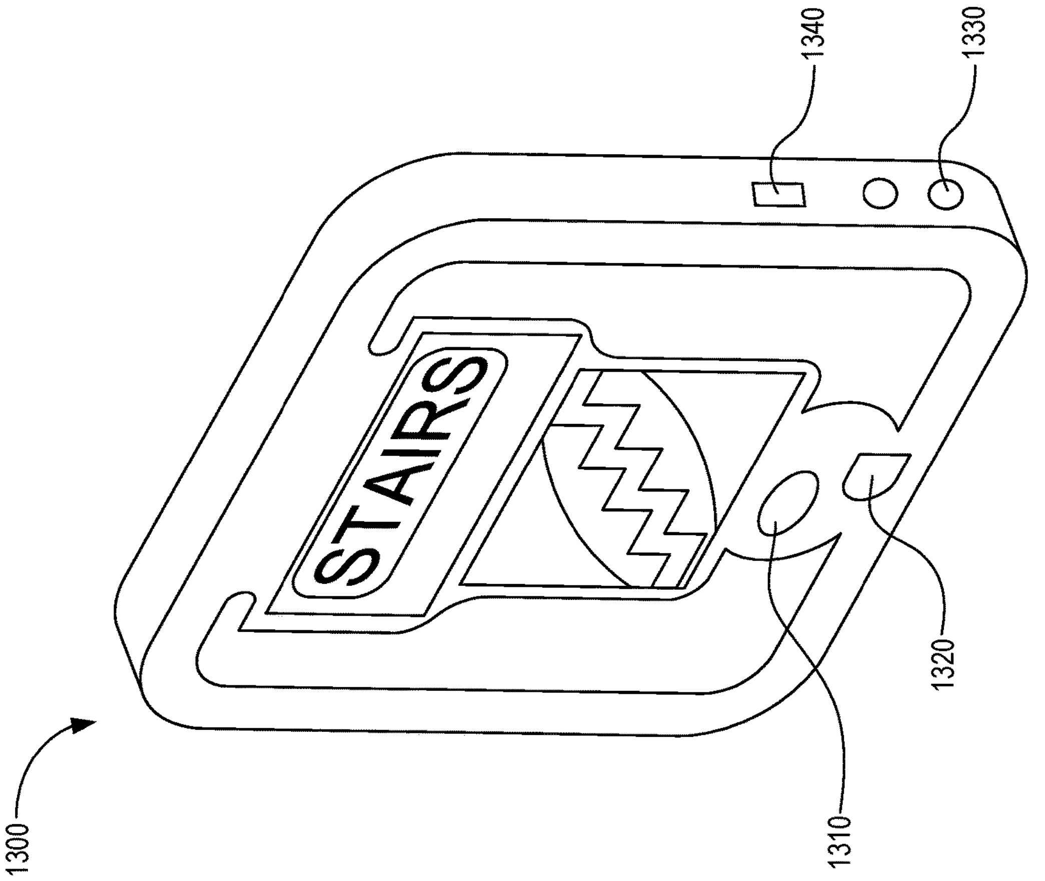
FIG. 13 illustrates a device integrated into a stairway sign, according to an example embodiment.

For instance, FIG. 12 shows a restroom door sign 1200 including a PIR sensor 1210, an LED light 1220, security and audio switches 1230, and a battery charge port 1240. FIG. 13 shows a stair door sign 1300 including a PIR sensor 1310, an LED light 1320, security and audio switches 1330, and a battery charge port 1340.

Figure 14:
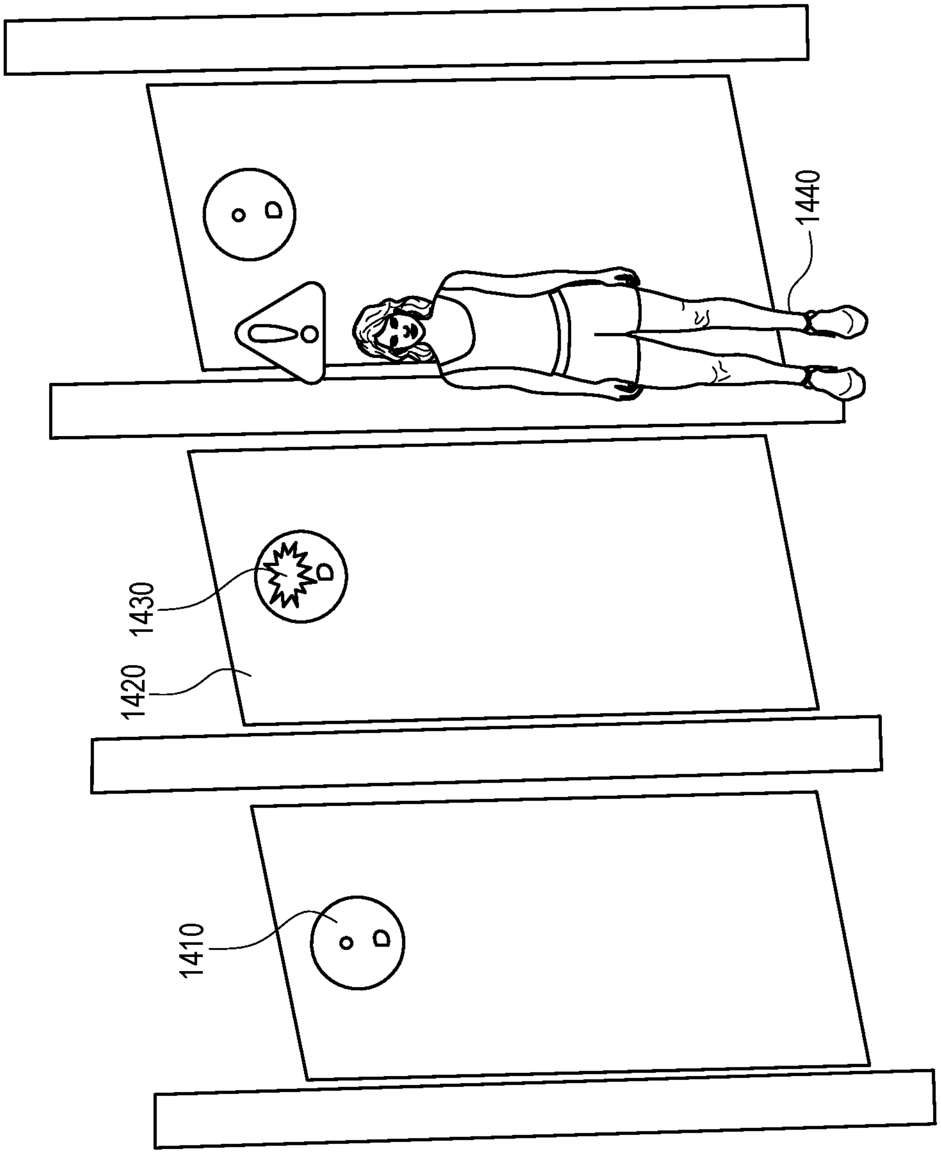
FIG. 14 illustrates a presence detection and notification system mounted on restroom stall doors, according to an example embodiment.

In some embodiments, a system according to the present disclosure may be applied to restroom stall doors. Embarrassing situations may frequently occur when a restroom stall door is not fully latched and someone enters an occupied stall. As shown in FIG. 14, device 1410 is added to a stall door 1420 providing a motion activated-light indication 1430 to a person outside 1440 that the stall is occupied. In addition, a unit on the inside of the stall door (not shown) may provide an indication to the stall occupant that someone is moving on the outside of the door.

Figure 15:
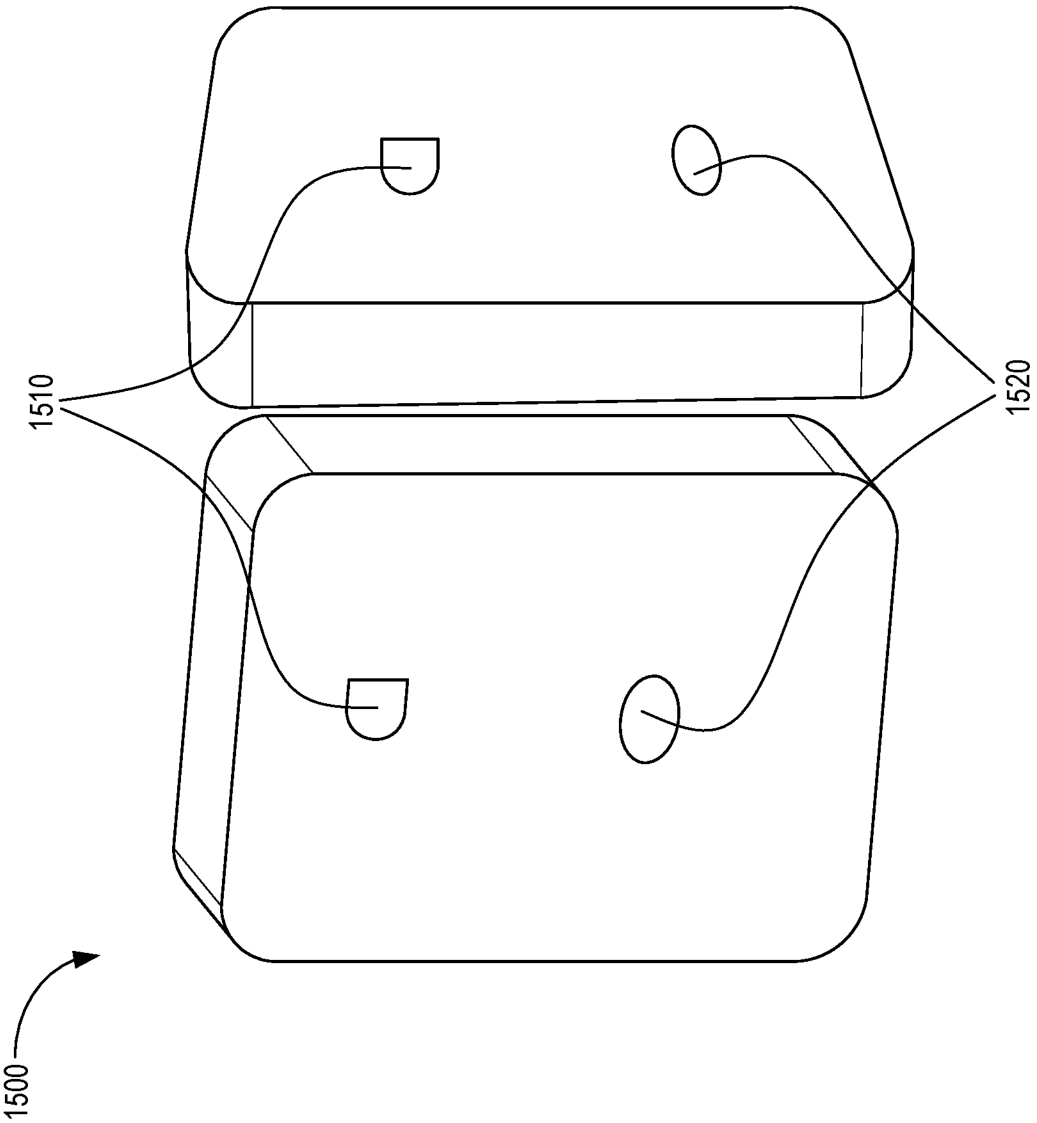
FIG. 15 illustrates a presence detection and notification system for use at a corner, according to an example embodiment.

According to some embodiments, a system may be added to any corner where a motion alert would add safety and convenience. FIG. 15 shows a corner design 1500. The design combines two units at a 90-degree angle with mounting points to be installed at a corner. Each unit includes a PIR sensor 1510 and an LED light 1520, and can provide an alert to individuals approaching the corner if motion is detected in the other direction.

Figure 16:
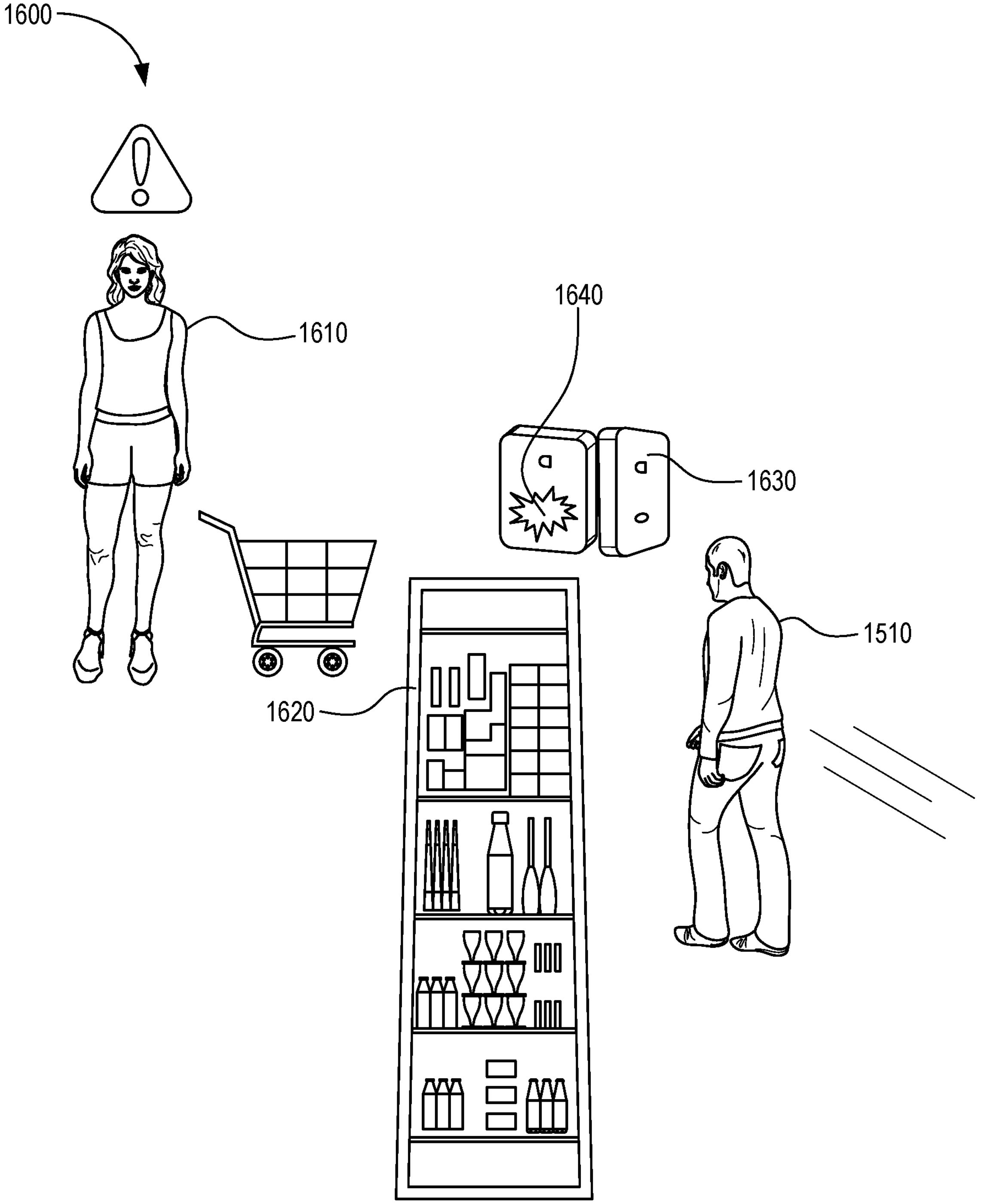
FIG. 16 illustrates a presence detection and notification system mounted at a corner between aisles of a grocery store, according to an example embodiment.

In one aspect, a corner design can be applied in grocery stores where high traffic corners have a high risk of collision between shoppers pushing grocery carts. For instance, FIG. 16 shows a situation 1600 in which two shoppers 1610 and 1650 are approaching a corner between two aisles at the grocery store. The view around the corner is obstructed from grocery shelving 1620. The corner design 1630 issues a visual alert 1640 to shopper 1610 that the shopper 1650 is approaching.

In other embodiments, the corner design can be applied to department stores, warehouses and big box stores, high-traffic hallway corners in office buildings or hospitals, schools and colleges, and as a tool to help security personnel visually detect motion.

Figure 17A:
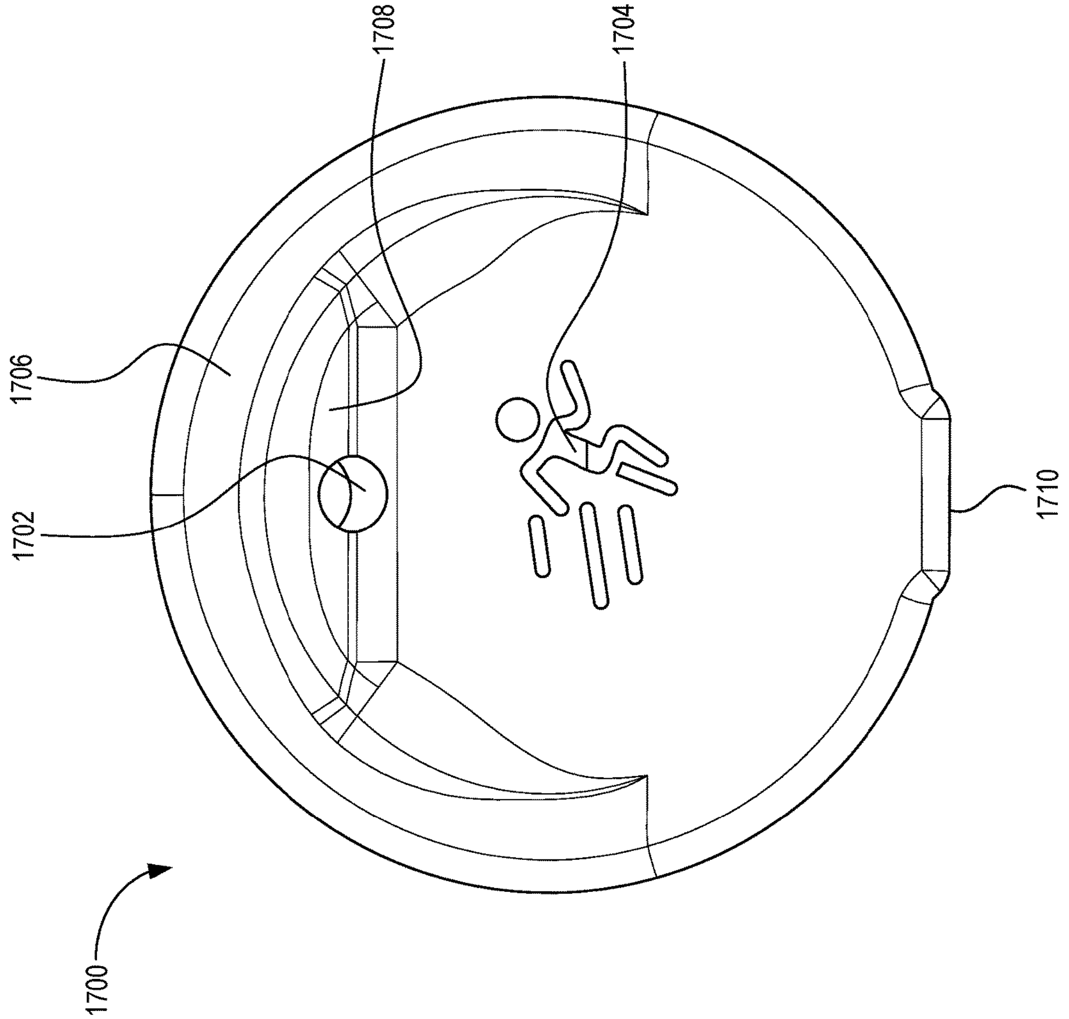
FIG. 17A illustrates a front perspective view of a device according to an example embodiment.

FIG. 17A shows a device 1700 having a PIR sensor 1702, an LED light 1704, and a housing 1706. The PIR sensor 1702 is disposed at a slanted surface 1708 of the housing so that the sensor 1702 points downward at approximately 45 degrees from a vertical axis of the device 1700. This allows for a better viewing angle of a presence of an object, such as people, pets, etc., when the device 1700 is mounted to a door or wall. The LED light 1704 may be transmitted by using a light pipe, and may shine through a cut-out design (e.g., a "running man" design) in the housing. The device 1700 further includes a flat bottom section 1710 so that the device can be set down on a flat surface. The device 1700 may be approximately 3 inches in diameter and 1.25 inches thick.

Figure 17B:
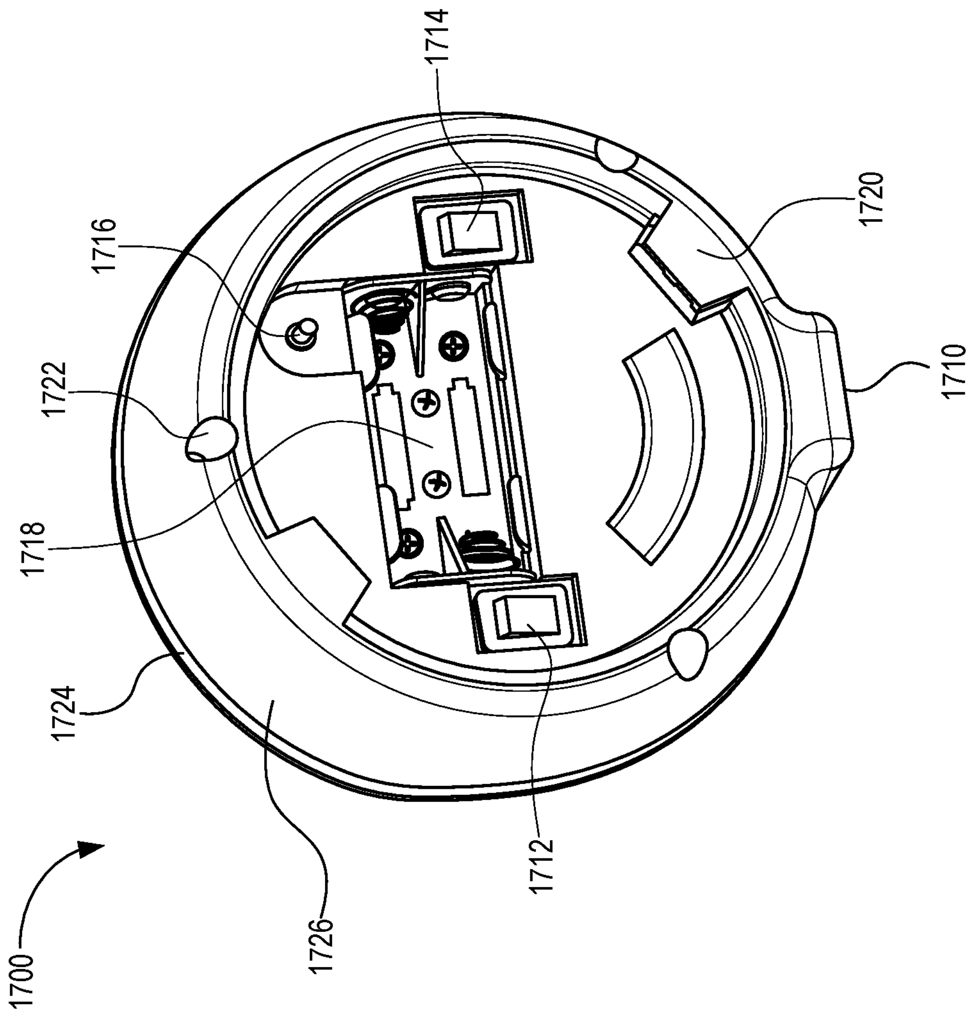
FIG. 17B illustrates a rear perspective view of the device shown in FIG. 17A.

FIG. 17B shows a rear perspective view of the device 1700. The device 1700 includes audio alert switch 1712, security mode switch 1714, pairing button 1716, battery compartment 1718, sleeves 1720, and screw holes 1722. The sleeves 1720 are for receiving tabs of a mounting plate. The screw holes 1722 are for attaching a front part 1724 of the housing with a back part 1726 of the housing. The pairing button 1716 is used to wirelessly pair the device 1700 to another device. After adding batteries to the battery compartment 1718, a user can press and hold the pairing button 1716. LED lights on both units can flash a few times until they are done pairing. The device may remain paired until this operation is repeated, even if the batteries are drained and replaced.

Figure 17C:
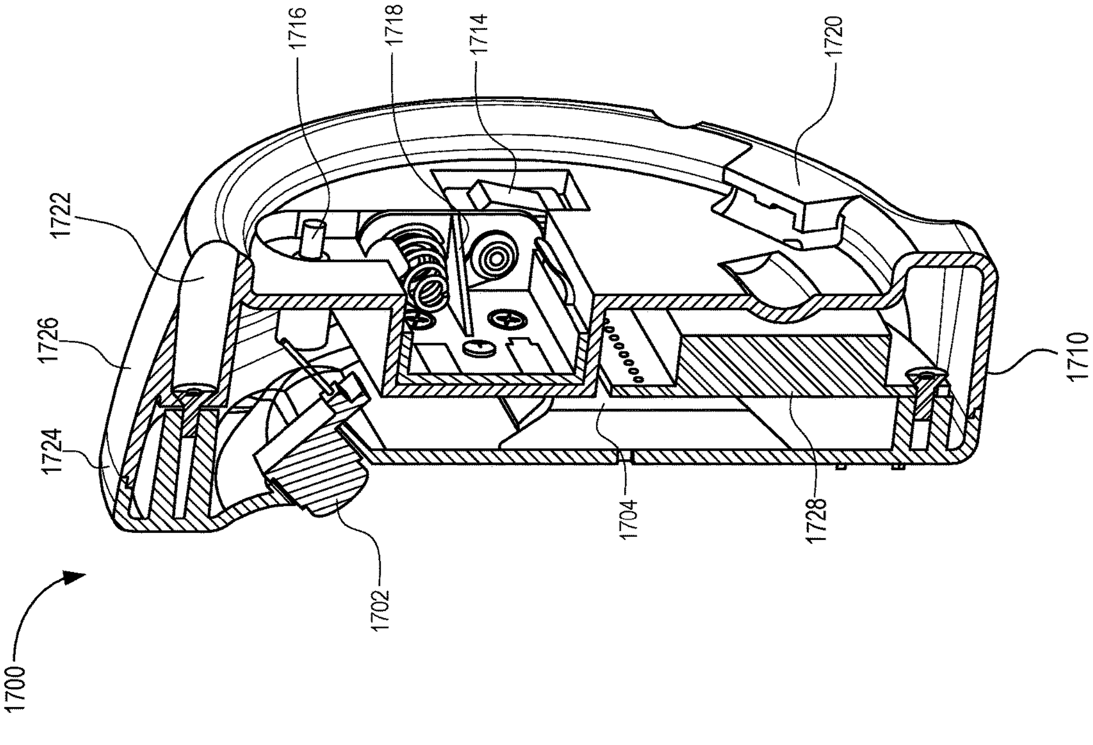
FIG. 17C illustrates a cross-sectional view of the device shown in FIG. 17A.

FIG. 17C shows a cross-sectional view of the device 1700. As shown in this figure, the device 1700 includes a circuit board 1728 that is electrically connected to the LED light 1704.

Figure 17D:
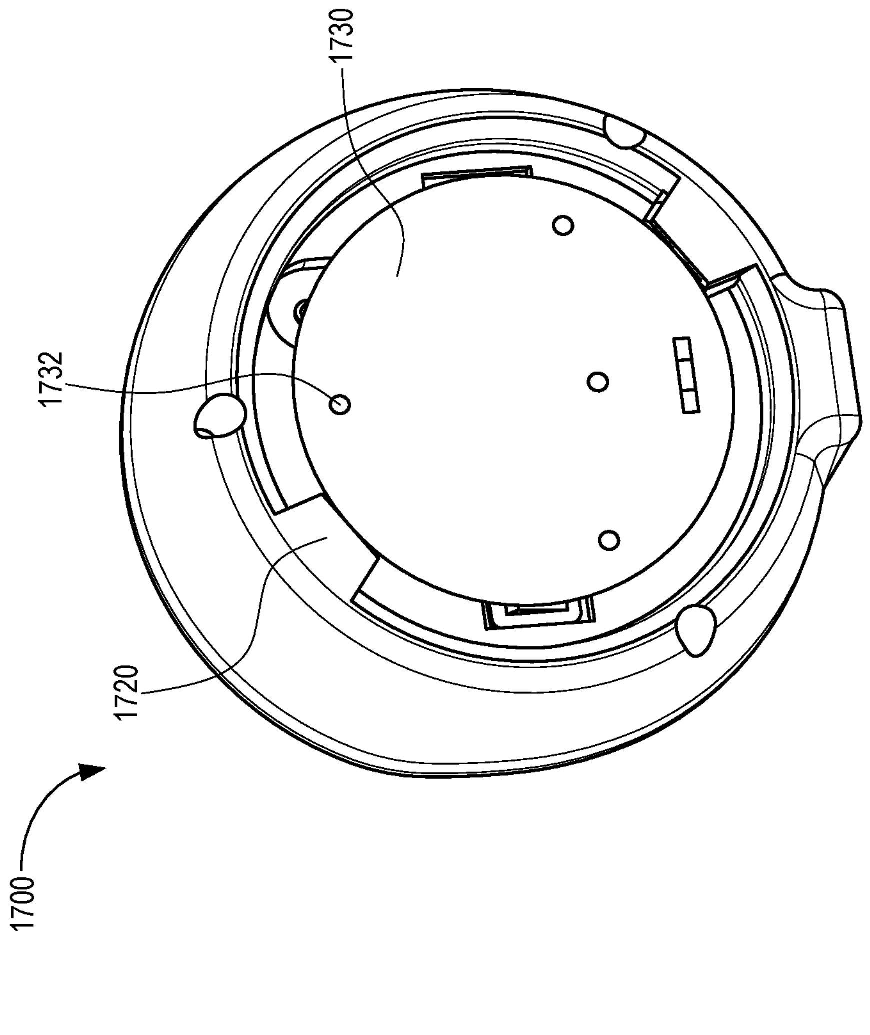
FIG. 17D illustrates a rear perspective view of the device shown in FIG. 17A as attached to a mounting plate.

FIG. 17D shows a rear perspective of the device 1700 as attached to a mounting plate 1730. The mounting plate 1730 includes screw holes 1732 for attachment to a surface, such as the surface of a door. The mounting plate 1730 can also be attached to a surface using adhesive tape. The mounting plate includes tabs (not shown) that slide into the sleeves 1720 of the device 1700. As such, the device can be twisted on and off the mounting plate.

Figure 18:
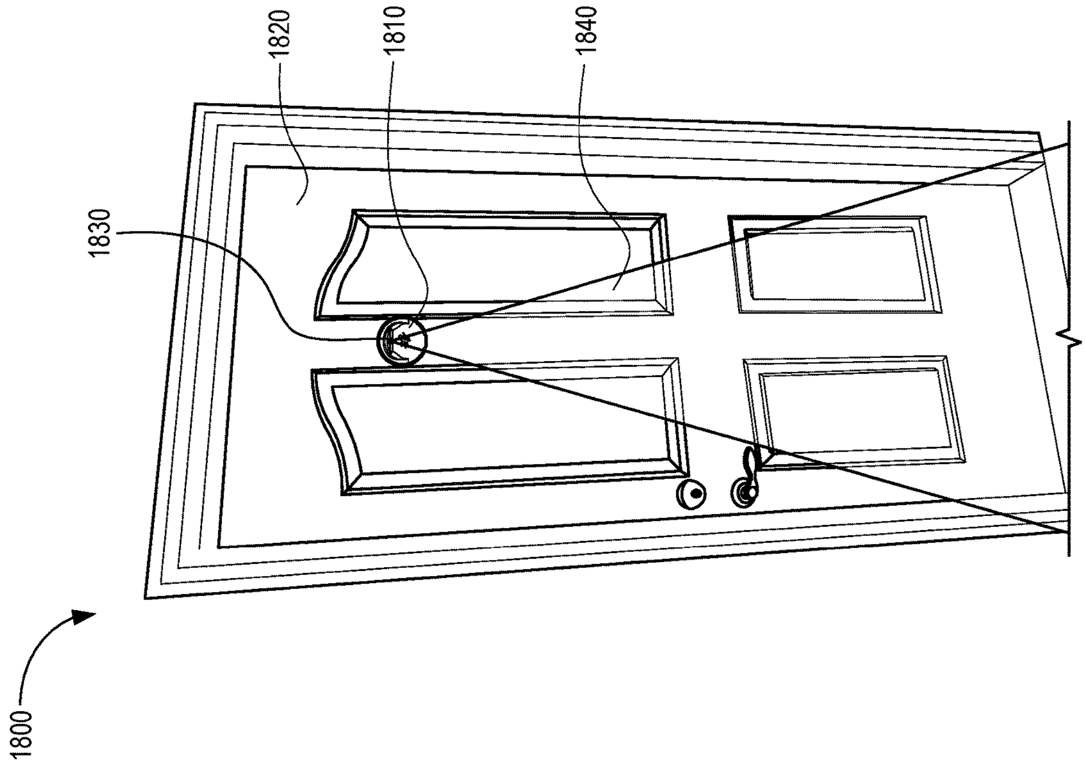
FIG. 18 illustrates the detection range of a presence detection and notification system according to an example embodiment.

FIG. 18 shows an arrangement 1800 in which a device 1810 is attached to an apartment door 1820. The PIR detector 1830 of the device 1810 has a viewing angle 1840 such that the presence of objects such as humans or other living animals can be detected in front of the door. Alternatively, the device 1810 can be installed or placed proximate to the door, e.g., close enough to the door so as to sense motion in front of the door or in the doorway.

Figure 19:
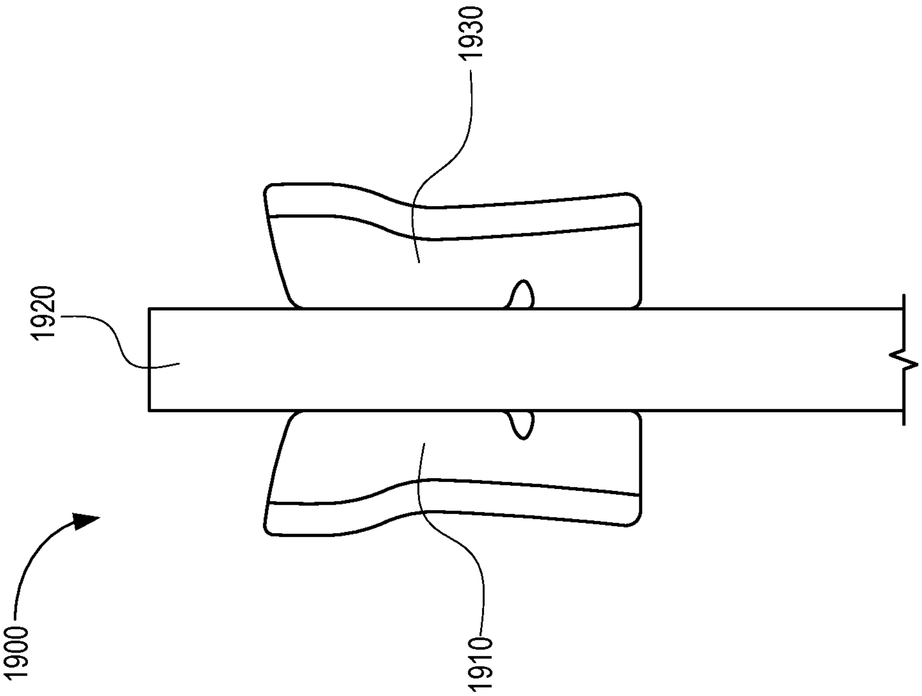
FIG. 19 illustrates devices mounted on opposite sides of a door, according to an example embodiment.

FIG. 19 shows an arrangement 1900 in which two devices 1910 and 1930 communicating wirelessly with one another are mounted on opposite side of a door 1920. Alternatively, the devices 1910 and 1930 can be proximate to the door or a doorway so that they are able to communicate wirelessly with one another and can detect motion on both sides of the door.

Figure 20A:
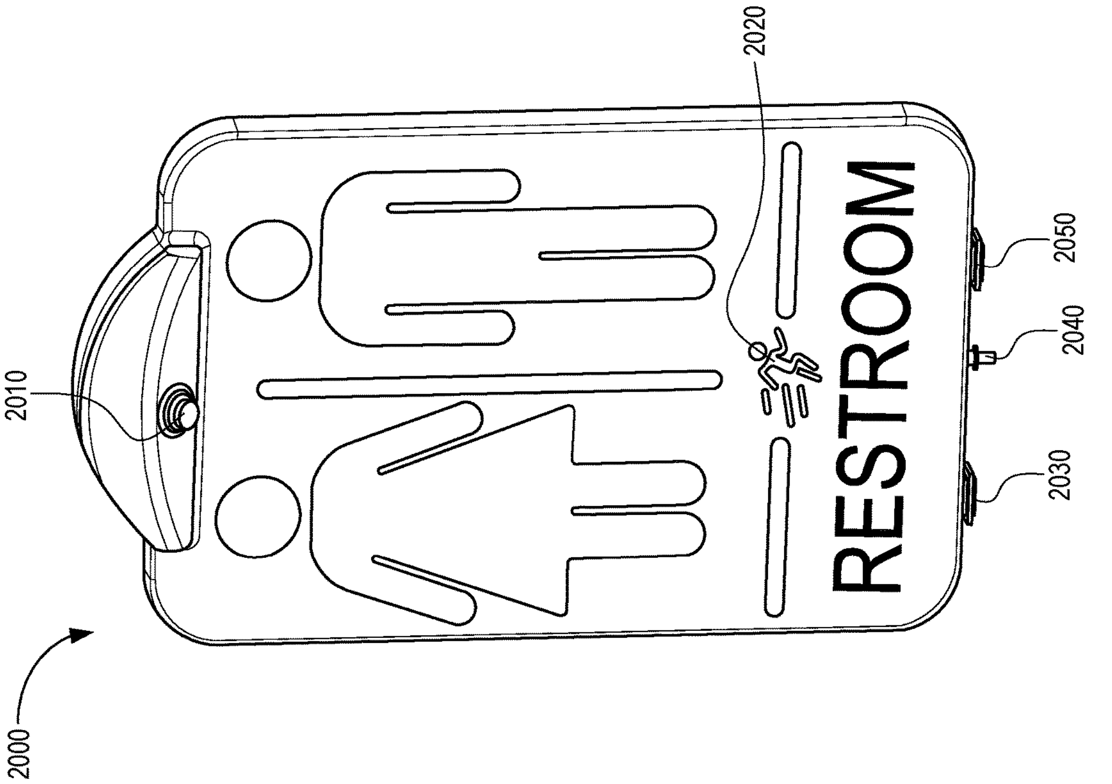
FIG. 20A illustrates a device integrated into a restroom sign, according to one example embodiment.

FIG. 20A shows another example embodiment of a restroom sign 2000. The restroom sign includes PIR sensor 2010, LED light 2020, audio alert switch 2030, pairing button 2040, and security mode switch 2050. The restroom sign 2000 may be attached to the exterior side of a restroom door.

Figure 20B:
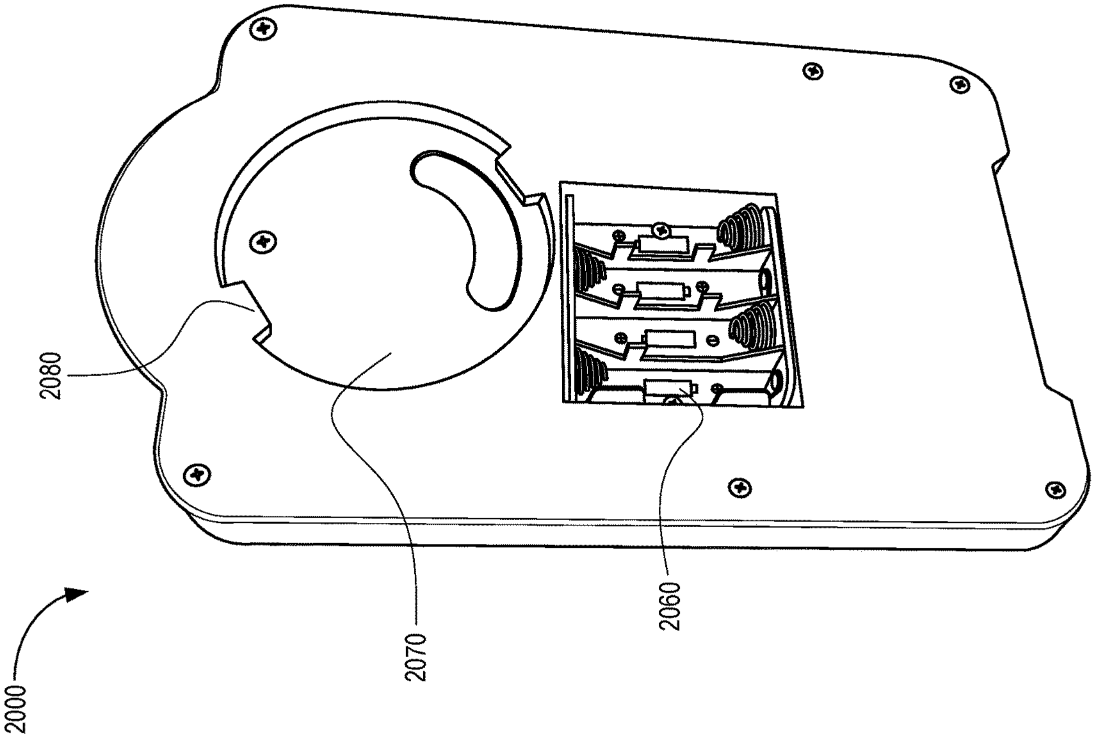
FIG. 20B illustrates a rear perspective view of the device shown in FIG. 20A.

FIG. 20B shows a rear perspective view of the restroom sign 2000. As shown in this figure, the restroom sign 2000 includes a battery compartment 2060 and a recessed portion 2070 for receiving a mounting plate. The restroom sign further includes sleeves 2080 for receiving tabs of a mounting plate.

Figure 21:
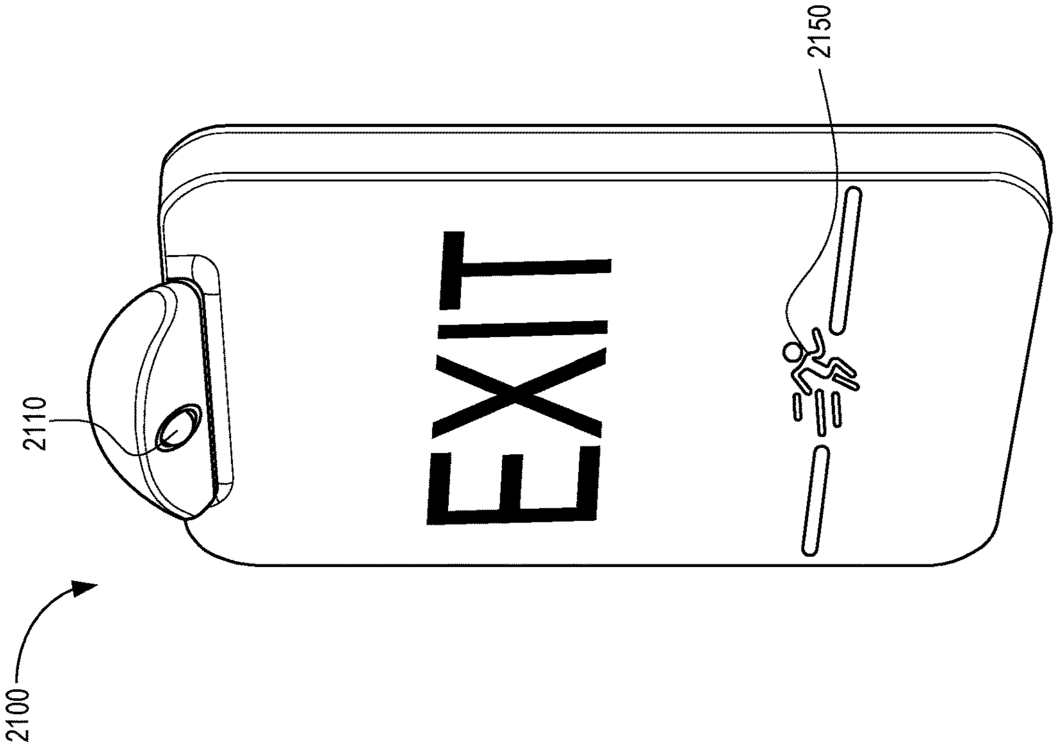
FIG. 21 illustrates a device integrated into an exit sign, according to an example embodiment.

The restroom sign 2000 may communicate wirelessly with an exit sign, such as the exit sign 2100 shown in FIG. 21. The exit sign 2100 includes PIR sensor 2110 and LED light 2150. The exit sign 2100 may be mounted on the interior side of a restroom door.

As shown in FIG. 20A, the audio alert and security mode switches and pairing button are present on the restroom sign 2000. Alternatively, they may be present on the exit sign. As another alternative, they may be provided on both the restroom and exit signs.

When the restroom sign 2000 and exit sign 2100 are paired wirelessly, a person approaching a restroom door from the outside may be notified by the LED light 2020 that a person is approaching the door from the inside. Likewise, a person approaching a restroom door from the inside may be notified by the LED 2150 that a person is approaching the door from the outside.

Some embodiments include different power options. For instance, the devices can be powered by two AA or AAA 1.5 batteries. As another example, the devices may include rechargeable NiMh or NiCd batteries including a USB-C charge port (including an inexpensive charging cord). In external applications, the devices can be powered by solar power. As another example, the devices can be connected by wire to a power source.

Some embodiments include different wireless communication options. For instance, the two units may communicate with each other through infrared. The channels for communication can be varied such that units with specific channels are used for installations where multiple units are installed nearby (e.g., restroom doors). As such, many units can be used in the same space. Each pair of devices may pair separately and do not interfere with other devices in the same space. For example, the system could be used on two restroom doors near each other.

RF Radio Frequency is another wireless option. RF waves may easily penetrate most solid materials—wood doors typically present no difficulty at all. Another option is Wi-Fi (e.g., IEEE 802.11). This, of course, would require a Wi-Fi network. Another option is Bluetooth and BLE (e.g., IEEE 802.15.1). Another option is the 802.15.4 standard, which targets short-range, low- to medium-data-rate and low-power-consumption use cases. This serves as the basis for other standards. In yet another option, the devices can communicate via an NB-Iot simplified standard providing very low power consumption for connected devices.

Some embodiments include different motion sensing options. For instance, the devices may use PIR (passive infrared) sensors. Alternatively, the devices may use proximity sensors. Proximity sensors may be very effective (with few false readings) for outside applications (e.g., a device installed on exterior doors). Proximity sensors are commonly used on mobile devices.

In some embodiments, the devices may include at least one of a light sensor for detecting ambient light, and a sound sensor (e.g., microphone) for detecting audible sound as well as sound undetectable by humans.

In some embodiments, the system can be integrated with an app to extend alerts to a connected device. This may utilize connection with Wi-Fi networks and security protocols. This may also utilize other types of radio transmission, such as Bluetooth.

In other embodiments, the devices may be mounted to a structure of, or within, a building, such as a door, wall, or post. Further, the devices may be mounted to a structure of, or within, a mobile structure, such as a boat or an RV. Alternatively, the devices may be set on a flat surface.

In other embodiments, the system may not require a Wi-Fi network or a subscription. As long as both devices are within wireless range (approximately 20 feet) the system may function. As such, the system can be used in remote locations such as a sailboat in the ocean, or a cabin in the wilderness. A phone or app may not be required. The system may be capable of constantly monitoring, so that when one enters a specific space, the user receives a visual and/or audio alert.

In some embodiments, the system is battery powered so that one can move and place it where needed. As such, it may be possible to monitor whether a child enters a hallway. As another example, it may be possible for a realtor hosting an open house to receive a notification when someone enters the front door. The units can be twisted off of door mounts and placed where desired. The second unit may be carried with a user around a house or just set nearby, so long as the units are within wireless range.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions. For example, it is to be understood that the disclosure contemplates that, to the extent possible, one or more features of any embodiment can be combined with one or more features of any other embodiment.

The invention claimed is:

1. A system for presence detection and notification, comprising:

a first unit comprising a first sensor and a first visual alert;

a second unit comprising a second sensor and a second visual alert, wherein the first unit is constructed to send a signal to the second unit to trigger the second visual alert, when the first sensor detects a presence;

two half-barrels adapted to be inserted into a peephole of a door, wherein the half-barrels have electrical connections integrated therein such that the first and second units can be mounted on opposite sides of the door and electrically connected through the peephole, and wherein the first and second units each comprise a peephole lens;

wherein the second unit is constructed to send a signal to the first unit to trigger the first visual alert, when the second sensor detects a presence, and wherein the first and second visual alerts are constructed to be triggered independently of one another such that the first visual alert is triggered by the presence detected by the second sensor and not by the presence detected by the first sensor, and the second visual alert is triggered by the presence detected by the first sensor and not by the presence detected by the second sensor.

2. The system of claim 1, wherein the first unit comprises a switch for a security mode in which the second visual alert is deactivated.

3. The system of claim 1, wherein the first and second units are attachable to or proximate opposite sides of a door.

4. The system of claim 1, wherein the first and second visual alerts comprise an LED.

5. The system of claim 1, wherein the first unit comprises a first audio alert that is triggered by the signal sent to the first unit, and wherein the second unit comprises a second audio alert that is triggered by the signal sent to the second unit.

6. The system of claim 5, wherein the first unit comprises a switch that deactivates the first and second audio alerts.

7. The system of claim 1, wherein the first and second units each comprise a wireless transmitter and receiver for communicating with one another.

8. The system of claim 1, wherein the system is adapted to be integrated with a computer application to extend alerts to connected devices via a radio transmission.

9. The system of claim 1, further comprising a wire ribbon connecting the first unit with the second unit.

10. The system of claim 1, wherein the first and second sensors are passive infrared sensors.

11. The system of claim 1, wherein the first and second sensors are proximity sensors.

12. The system of claim 1, wherein the first visual alert is adapted to blink when the first unit no longer senses signal from the second unit.

13. The system of claim 1, wherein at least one of the first and second units is integrated into signage.

14. A system for presence detection and notification, comprising:

a first unit attachable to a surface, the first unit comprising a first sensor, a first visual alert, a first audio alert, and a first wireless transmitter and receiver;

a second unit attachable to a surface, the second unit comprising a second sensor, a second visual alert, a second audio alert, and a second wireless transmitter and receiver;

wherein the first wireless transmitter is constructed to a send a signal to the second wireless receiver to trigger the second visual alert and the second audio alert, when the first detector detects a presence;

wherein the second wireless transmitter is constructed to send a signal to the first wireless receiver to trigger the first visual alert and the first audio alert, when the second sensor detects a presence;

wherein the system is configured such that the first and second visual alerts are triggered independently of one another, and the first and second audio alerts are triggered independently of one another such that the first visual alert and the first audio alert are triggered by the presence detected by the second sensor and not by the presence detected by the first sensor, and the second visual alert and the second audio alert are triggered by the presence detected by the first sensor and not by the presence detected by the second sensor;

wherein the first visual alert is further adapted to blink when the first unit no longer senses signal from the second unit;

wherein the first unit comprises a switch for a security mode in which the second visual alert is deactivated; and wherein the first unit comprises an audio switch for deactivating the first and second audio alerts.

15. The system of claim 14, wherein the first and second wireless transmitters are radio frequency transmitters, and the first and second wireless receivers are radio frequency receivers.

16. The device of claim 14, wherein the first wireless transmitter and receiver and the second wireless transmitter and receiver are Bluetooth capable.

17. A method for presence detection and notification, comprising:

providing a first unit comprising a first sensor and a first visual alert, and a second unit comprising a second sensor and a second visual alert;

installing or setting at least one of the first and second units on a surface;

sending a signal from the first unit to the second unit when a presence is detected by the first sensor, to trigger the second visual alert;

sending a signal from the second unit to the first unit when a presence is detected by the second sensor, to trigger the first visual alert;

putting the system into a security mode by using a switch on the first unit, wherein, in the security mode, the second visual alert is deactivated;

wherein the first and second visual alerts are triggered independently of one another such that the first visual alert is triggered by the presence detected by the second sensor and not by the presence detected by the first sensor, and the second visual alert is triggered by the presence detected by the first sensor and not by the presence detected by the second sensor; and wherein the first visual alert is further adapted to blink when the first unit no longer senses signal from the second unit.

18. The method of claim 17, comprising installing the first and second units on or proximate to opposite sides of a door.

19. The method of claim 17, comprising installing the first and second units at or proximate to a corner between two walls or partitions.

20. The system of claim 15, further comprising two half-barrels comprising the first and second units adapted to be inserted into a peephole of a door, wherein the half-barrels have the first and second transmitters and the first and second receivers integrated therein such that the first and second units can be mounted on opposite sides of the door and the first and second units each comprise a peephole lens.

21. The method of claim 17, wherein the first and second units comprise two half-barrels adapted to be inserted into a peephole of a door, wherein the half-barrels include first and second transmitters and first and second receivers, respectively, communicating using said signals and integrated therein such that the first and second units can be mounted on opposite sides of the door and the first and second units each comprise a peephole lens.

* * * * *